US011069210B2

(12) United States Patent
Troughton

(10) Patent No.: US 11,069,210 B2
(45) Date of Patent: Jul. 20, 2021

(54) SELECTING A VIDEO FRAME FOR NOTIFICATION USING AUDIO/VIDEO RECORDING AND COMMUNICATION DEVICES

(71) Applicant: Amazon Technologies, Inc., Seattle, WA (US)

(72) Inventor: Mark Troughton, Santa Monica, CA (US)

(73) Assignee: Amazon Technologies, Inc., Seattle, WA (US)

( * ) Notice: Subject to any disclaimer, the term of this patent is extended or adjusted under 35 U.S.C. 154(b) by 439 days.

(21) Appl. No.: 16/019,909

(22) Filed: Jun. 27, 2018

(65) Prior Publication Data

US 2019/0005790 A1    Jan. 3, 2019

Related U.S. Application Data

(60) Provisional application No. 62/526,207, filed on Jun. 28, 2017.

(51) Int. Cl.
*G08B 13/196*    (2006.01)
*H04L 29/08*    (2006.01)
(Continued)

(52) U.S. Cl.
CPC ... *G08B 13/19691* (2013.01); *G06K 9/00288* (2013.01); *G06K 9/00771* (2013.01); *G06K 9/00979* (2013.01); *G06K 9/036* (2013.01); *G08B 3/10* (2013.01); *G08B 13/19608* (2013.01); *G08B 13/19613* (2013.01);
(Continued)

(58) Field of Classification Search
CPC .... G06K 2009/00738; G08B 13/19691; G08B 13/19695; G08B 13/19608; H04L 67/26
See application file for complete search history.

(56) References Cited

U.S. PATENT DOCUMENTS 4,764,953 A    8/1988 Chern et al.
5,428,388 A    6/1995 von Bauer et al.
(Continued)

FOREIGN PATENT DOCUMENTS

CN    2585521 Y    11/2003
CN    2792061 Y    6/2006
(Continued)

*Primary Examiner* — Mainul Hasan
(74) *Attorney, Agent, or Firm* — Greenberg Traurig, LLP

(57) ABSTRACT

Some embodiments provide for obtaining image data representative of a field of view of a camera as captured by the camera of an A/V recording and communication device. The image data may be analyzed and, based at least in part on the analysis, it may be determined that the image data is representative of a first facial image of a person and a second facial image of the person. From the facial images, it may be determined that the first facial image is of higher quality than the second facial image and, based on this determination, a frame may be selected that is represented by the image data and corresponds to the first facial image. A notification may be generated that includes a portion of the image data that represents the frame, and the notification may be transmitted to a client device associated with the A/V recording and communication device.

20 Claims, 29 Drawing Sheets

(51) Int. Cl.
  *H04N 5/76* (2006.01)
  *G06K 9/00* (2006.01)
  *G06K 9/03* (2006.01)
  *G08B 3/10* (2006.01)
  *H04N 5/77* (2006.01)

(52) U.S. Cl.
  CPC . *G08B 13/19619* (2013.01); *G08B 13/19663* (2013.01); *G08B 13/19695* (2013.01); *H04L 67/26* (2013.01); *H04N 5/76* (2013.01); *H04N 5/77* (2013.01); *G06K 2009/00738* (2013.01); *G08B 13/19684* (2013.01)

(56) References Cited

U.S. PATENT DOCUMENTS

| | | | |
|---|---|---|---|
| 5,760,848 A | 6/1998 | Cho | |
| 6,072,402 A | 6/2000 | Kniffin et al. | |
| 6,192,257 B1 | 2/2001 | Ray | |
| 6,271,752 B1 | 8/2001 | Vaios | |
| 6,429,893 B1 | 8/2002 | Xin | |
| 6,456,322 B1 | 9/2002 | Marinacci | |
| 6,476,858 B1 | 11/2002 | Ramirez Diaz et al. | |
| 6,633,231 B1 | 10/2003 | Okamoto et al. | |
| 6,633,655 B1 * | 10/2003 | Hong | G06K 9/00255 382/118 |
| 6,658,091 B1 | 12/2003 | Naidoo et al. | |
| 6,753,774 B2 | 6/2004 | Pan et al. | |
| 6,970,183 B1 | 11/2005 | Monroe | |
| 7,062,291 B2 | 6/2006 | Ryley et al. | |
| 7,065,196 B2 | 6/2006 | Lee | |
| 7,085,361 B2 | 8/2006 | Thomas | |
| 7,109,860 B2 | 9/2006 | Wang | |
| 7,193,644 B2 | 3/2007 | Carter | |
| 7,304,572 B2 | 12/2007 | Sheynman et al. | |
| 7,382,249 B2 | 6/2008 | Fancella | |
| 7,450,638 B2 | 11/2008 | Iwamura | |
| 7,643,056 B2 | 1/2010 | Silsby | |
| 7,683,924 B2 | 3/2010 | Oh et al. | |
| 7,683,929 B2 | 3/2010 | Elazar et al. | |
| 7,738,917 B2 | 6/2010 | Ryley et al. | |
| 8,139,098 B2 | 3/2012 | Carter | |
| 8,144,183 B2 | 3/2012 | Carter | |
| 8,154,581 B2 | 4/2012 | Carter | |
| 8,619,136 B2 | 12/2013 | Howarter et al. | |
| 8,872,915 B1 | 5/2014 | Scalisi et al. | |
| 8,780,201 B1 | 7/2014 | Scalisi et al. | |
| 8,823,795 B1 | 9/2014 | Scalisi et al. | |
| 8,842,180 B1 | 9/2014 | Kasmir et al. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Scalisi | |
| 9,094,584 B2 | 7/2015 | Scalisi et al. | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi | |
| 9,179,108 B1 | 11/2015 | Scalisi | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,508,239 B1 | 11/2016 | Harrison et al. | |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 2002/0094111 A1 | 7/2002 | Puchek et al. | |
| 2002/0147982 A1 | 10/2002 | Naidoo et al. | |
| 2003/0043047 A1 | 3/2003 | Braun | |
| 2004/0085205 A1 | 5/2004 | Yeh | |
| 2004/0085450 A1 | 5/2004 | Stuart | |
| 2004/0086093 A1 | 5/2004 | Schranz | |
| 2004/0095254 A1 | 5/2004 | Maruszczak | |
| 2004/0135686 A1 | 7/2004 | Parker | |
| 2005/0111660 A1 | 5/2005 | Hosoda | |
| 2006/0010199 A1 | 1/2006 | Brailean et al. | |
| 2006/0022816 A1 | 2/2006 | Yukawa | |
| 2006/0139449 A1 | 6/2006 | Cheng et al. | |
| 2006/0156361 A1 | 7/2006 | Wang et al. | |
| 2006/0170791 A1 * | 8/2006 | Porter | G06K 9/00295 348/231.3 |
| 2006/0203101 A1 * | 9/2006 | Silsby | H04N 5/23206 348/222.1 |
| 2007/0008081 A1 | 1/2007 | Tylicki et al. | |
| 2007/0103548 A1 * | 5/2007 | Carter | G07C 9/32 348/143 |
| 2010/0225455 A1 | 9/2010 | Claiborne et al. | |
| 2013/0057695 A1 | 3/2013 | Huisking | |
| 2014/0044348 A1 * | 2/2014 | Chen | G06K 9/00275 382/159 |
| 2014/0267716 A1 | 9/2014 | Child et al. | |
| 2015/0163463 A1 | 6/2015 | Hwang et al. | |
| 2016/0063235 A1 * | 3/2016 | Tussy | G06K 9/00912 726/6 |
| 2016/0203370 A1 * | 7/2016 | Child | G06K 9/00288 348/143 |
| 2016/0217638 A1 * | 7/2016 | Child | H04L 12/2803 |
| 2017/0220872 A1 * | 8/2017 | Child | G08B 13/196 |
| 2019/0384965 A1 * | 12/2019 | Rodriguez | G06K 9/00744 |

FOREIGN PATENT DOCUMENTS

| | | |
|---|---|---|
| EP | 0944883 A1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 2009-008925 A | 1/2009 |
| WO | 1998/39894 A1 | 9/1998 |
| WO | 2001/13638 A1 | 2/2001 |
| WO | 2001/93220 A1 | 12/2001 |
| WO | 2002/085019 A1 | 10/2002 |
| WO | 2003/028375 A1 | 4/2003 |
| WO | 2003/096696 A1 | 11/2003 |
| WO | 2006/038760 A1 | 4/2006 |
| WO | 2006/067782 A1 | 6/2006 |
| WO | 2007/125143 A1 | 8/2007 |

* cited by examiner

SELECTING A VIDEO FRAME FOR NOTIFICATION USING AUDIO/VIDEO RECORDING AND COMMUNICATION DEVICES

CROSS-REFERENCE TO RELATED APPLICATION

This application claims priority to provisional application Ser. No. 62/526,207, filed on Jun. 28, 2017, the entire contents of which are hereby incorporated by reference.

TECHNICAL FIELD

The present embodiments relate to audio/video (A/V) recording and communication devices, including A/V recording and communication doorbell systems. In particular, the present embodiments relate to improvements in the functionality of A/V recording and communication devices that enhance the streaming and storing of video recorded by such devices.

BACKGROUND

Home security is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

SUMMARY

The various embodiments of the present selecting a video frame for notification using audio/video recording and communication devices have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that audio/video (A/V) recording and communication devices (e.g., video doorbells) other than the present embodiments may not use captured image data as effectively as desired when generating user alert notifications. The effectiveness of user alert notifications is important, because users of client devices associated with the A/V recording and communication devices may receive numerous user alert notifications on any given day, and some of these notifications may be more important and/or urgent than others. Thus, without informative notifications, important and/or urgent user alerts may be overlooked. In some examples, textual data may be used in lieu of the image data when generating user alert notifications. However, textual data may be repetitive and similar from alert to alert and thus may not offer enough unique information about the user alert to attract the user's attention. In other examples, A/V recording and communication devices other than the present embodiments may not leverage the image data as effectively as desired to provide more informative and helpful notifications of user alerts. For example, notifications of user alerts may include the first frame from the image data, which may not always include meaningful information, and similar to textual data, may not offer enough unique information about the user alert to attract the user's attention.

The present embodiments solve this problem by leveraging the functionality of A/V recording and communication devices, such as A/V recording and communication doorbells, to provide user alert notifications that include the image data in a more easily digestible and informative format. For example, the image data may be analyzed to determine a frame from the image data that is most relevant to the cause of the user alert (e.g., a frame including a facial image of a person who caused the user alert), and the frame may be included in the user alert notification. By leveraging the image data to provide more informative user alert notifications, users (e.g., homeowners) of the client devices associated with the A/V recording and communication devices may be more likely to not overlook the user alerts, but rather to view and interact with the user alerts. As a result, the users are more likely to identify suspicious activity around their homes and, in response, take appropriate actions, such as to alert law enforcement, sound an alarm, and/or notify neighbors, for example. Ultimately, because the users may be more likely to take appropriate action in response to more informative and effective user alert notifications, homes, neighborhoods, towns, and cities alike may benefit from enhanced public safety.

In a first aspect, an image notification of a person is provided using image data from an audio/video (A/V) recording and communication device having a camera by receiving the image data captured by the camera in a field of view of the camera; analyzing the image data; based on the analyzing, determining that the image data includes at least one frame including a facial image of the person; and in response to the determination, generating and transmitting, to a client device associated with the A/V recording and communication device, a user alert including the at least one frame.

In an embodiment of the first aspect, the at least one of the receiving the image data, analyzing the image data, determining that the image data includes at least one frame including a facial image of the person, and generating and transmitting the user alert is performed by a processor of the A/V recording and communication device.

In another embodiment of the first aspect, at least one of the receiving the image data, analyzing the image data, determining that the image data includes at least one frame including a facial image of the person, and generating and transmitting the user alert is performed by a processor of a backend device.

In another embodiment of the first aspect, the backend device is a server.

In another embodiment of the first aspect, the image data is received in response to a motion event detected in a field of view of the A/V recording and communication device.

In another embodiment of the first aspect, the motion event is detected by at least one of the camera and a motion sensor of the A/V recording and communication device.

In another embodiment of the first aspect, the analyzing the image data includes determining whether the person is present in the field of view of the camera.

In another embodiment of the first aspect, the at least one frame includes the highest quality facial image of the person.

In another embodiment of the first aspect, the highest quality facial image includes the facial image where the person is most identifiable.

In a second aspect, an image notification of a person is provided using image data from an audio/video (A/V) recording and communication device having a camera by, in response to a motion event detected by the A/V recording and communication device, receiving the image data of the motion event captured by the camera in a field of view of the camera; analyzing the image data; based on the analyzing, determining that the image data includes at least one frame including a facial image of the person; in response to the determination and based on the analyzing, selecting a highest quality frame from the at least one frame including the facial image of the person; in response to the selection, generating a user alert including the highest quality frame, the user alert programmed to display as a push-notification; and transmitting the user alert to a client device associated with the A/V recording and communication device.

In an embodiment of the second aspect, at least one of the receiving the image data, analyzing the image data, determining that the image data includes at least one frame including a facial image of the person, and generating and transmitting the user alert is performed by a processor of the A/V recording and communication device.

In another embodiment of the second aspect, at least one of the receiving the image data, analyzing the image data, determining that the image data includes at least one frame including a facial image of the person, and generating and transmitting the user alert is performed by a processor of a backend device.

In another embodiment of the second aspect, the backend device is a server.

In another embodiment of the second aspect, the push-notification includes the highest quality frame.

In another embodiment of the second aspect, the push-notification is programmed such that when a display of the client device receives an input on a portion of the display displaying the push-notification, the image data is displayed on the display.

In another embodiment of the second aspect, the image data includes streaming video of the motion event in the field of view of the camera.

In another embodiment of the second aspect, the streaming video is live.

In another embodiment of the second aspect, the highest quality frame includes the facial image where the person is most identifiable.

In another embodiment of the second aspect, the motion event is detected by at least one of the camera and a motion sensor of the A/V recording and communication device.

In another embodiment of the second aspect, the analyzing the image data includes determining whether the person is present in the field of view of the camera.

BRIEF DESCRIPTION OF THE DRAWINGS

The various embodiments of the present selecting a video frame for notification using audio/video recording and communication devices now will be discussed in detail with an emphasis on highlighting the advantageous features. These embodiments depict the novel and non-obvious selecting a video frame for notification using audio/video recording and communication devices shown in the accompanying drawings, which are for illustrative purposes only. These drawings include the following figures, in which like numerals indicate like parts.

DETAILED DESCRIPTION

Figure 1:
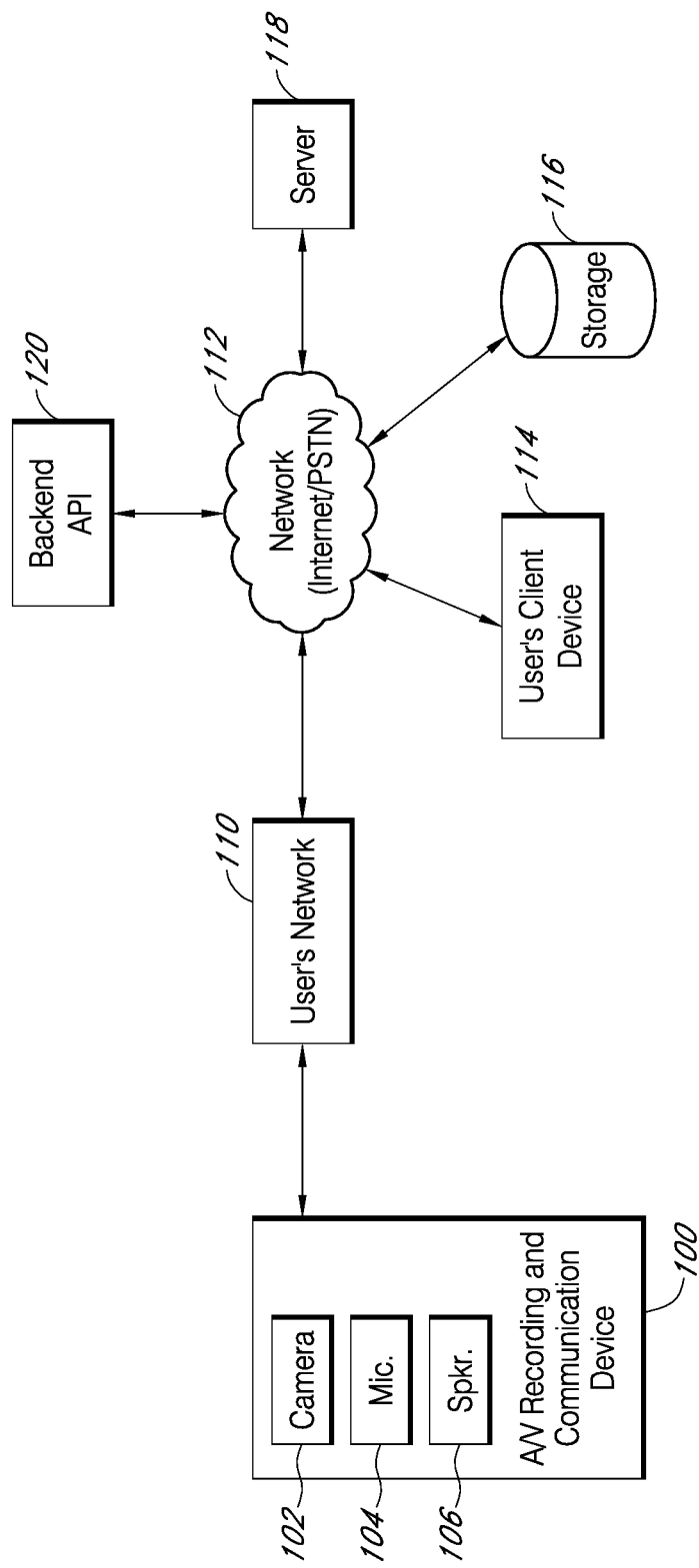
FIG. 1 is a functional block diagram illustrating one embodiment of a system including an A/V recording and communication device according to various aspects of the present disclosure.

The following detailed description describes the present embodiments with reference to the drawings. In the drawings, reference numbers label elements of the present embodiments. These reference numbers are reproduced below in connection with the discussion of the corresponding drawing features.

The embodiments of the present streaming and storing video for audio/video recording and communication devices are described below with reference to the figures. These figures, and their written descriptions, indicate that certain components of the apparatus are formed integrally (e.g., a single unitary piece), and certain other components are formed as separate pieces. Components shown and described herein as being formed integrally may in alternative embodiments be formed as separate pieces. Further, components shown and described herein as being formed as separate pieces may in alternative embodiments be formed integrally.

With reference to FIG. 1, the present embodiments include an audio/video (A/V) recording and communication device 100. The A/V recording and communication device 100 may in some embodiments comprise a doorbell, and may be located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image display resolution of 720p, or 1080p, or better. While not shown, the A/V recording and communication device 100 may also include other hardware and/or components, such as a housing, one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with a user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite systems (GNSS) (e.g., global positioning system (GPS)), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V recording and communication device 100 may also capture audio through the microphone 104. The A/V recording and communication device 100 may detect the visitor's presence by detecting motion using the camera 102 and/or a motion sensor, and/or by detecting that the visitor has depressed the front button on the A/V recording and communication device 100 (in embodiments in which the A/V recording and communication device 100 comprises a doorbell).

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
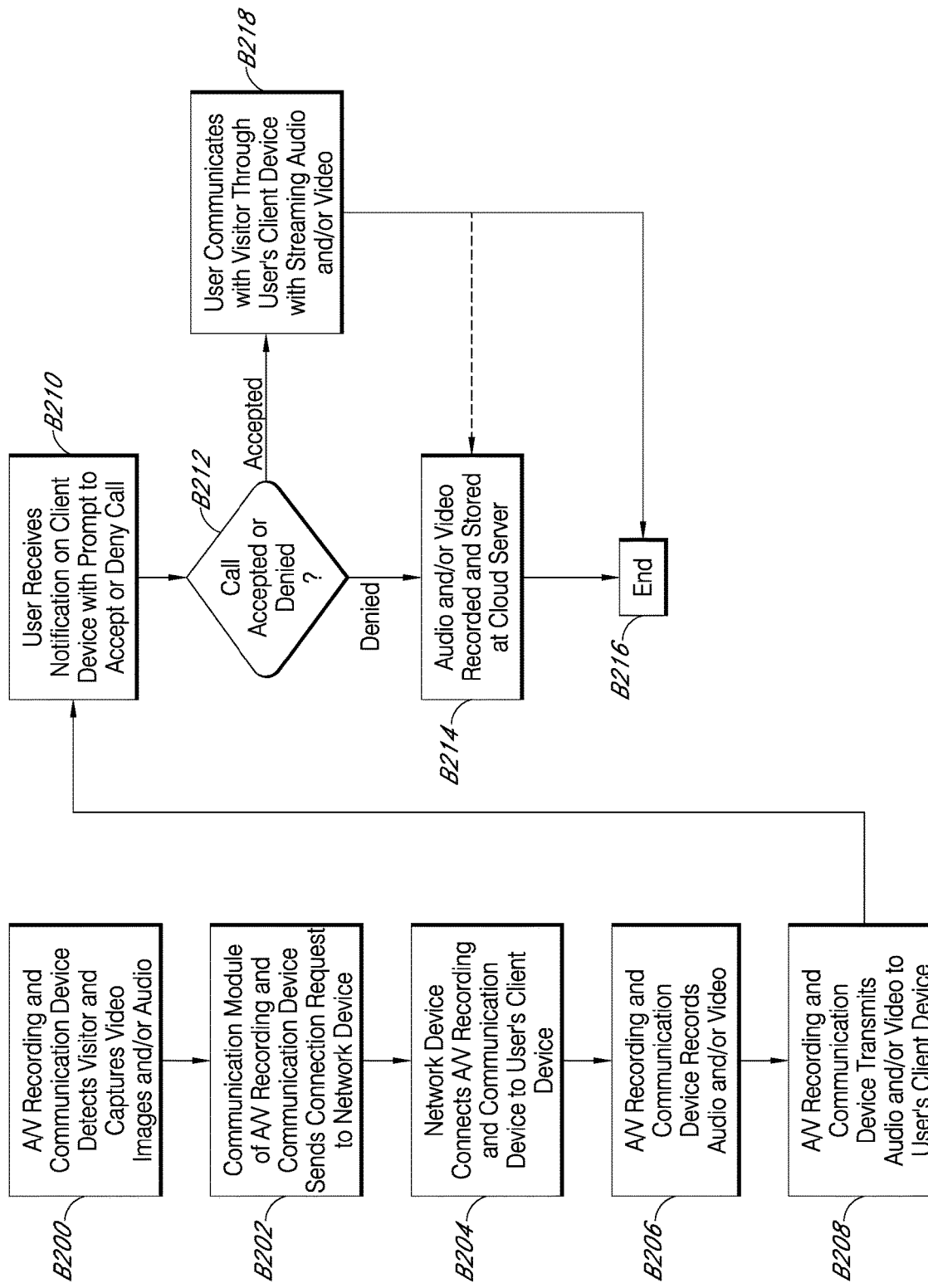
FIG. 2 is a flowchart illustrating one embodiment of a process for streaming and storing A/V content from an A/V recording and communication doorbell system according to various aspects of the present disclosure.

FIG. 2 is a flowchart illustrating a process for streaming and storing A/V content from an A/V recording and communication doorbell system according to various aspects of the present disclosure. At block B200, the A/V recording and communication device 100 detects the visitor's presence and begins capturing video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has depressed the front button on the A/V recording and communication device 100 (in embodiments in which the A/V recording and communication device 100 comprises a doorbell).

At block B202, a communication module of the A/V recording and communication device 100 sends a connection request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

In response to the request, at block B204 the network device may connect the A/V recording and communication device 100 to the user's client device 114 through the user's network 110 and the network 112. At block B206, the A/V recording and communication device 100 may record available audio and/or video data using the camera 102, the microphone 104, and/or any other sensor available. At block B208, the audio and/or video data is transmitted (streamed) from the A/V recording and communication device 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication device 100 and the user's client device 114 is terminated. If, however, the user accepts the notification, then at block B218 the user communicates with the visitor through the user's client device 114 while audio and/or video data captured by the camera 102, the microphone 104, and/or other sensors is streamed to the user's client device 114. At the end of the call, the user may terminate the connection between the user's client device 114 and the A/V recording and communication device 100 and the session ends at block B216. In some embodiments, the audio and/or video data may be recorded and stored at a cloud server (block B214) even if the user accepts the notification and communicates with the visitor through the user's client device 114.

Many of today's homes include a wired doorbell system that does not have A/V communication capabilities. Instead, standard wired doorbell systems include a button outside the home next to the front door. The button activates a signaling device (such as a bell or a buzzer) inside the building. Pressing the doorbell button momentarily closes the doorbell circuit, which may be, for example, a single-pole, single-throw (SPST) push button switch. One terminal of the button is wired to a terminal on a transformer. The transformer steps down the 120-volt or 240-volt household AC electrical power to a lower voltage, typically 16 to 24 volts. Another terminal on the transformer is wired to a terminal on the signaling device. Another terminal on the signaling device is wired to the other terminal on the button. A common signaling device includes two flat metal bar resonators, which are struck by plungers operated by two solenoids. The flat bars are tuned to different notes. When the doorbell button is pressed, the first solenoid's plunger strikes one of the bars, and when the button is released, a spring on the plunger pushes the plunger up, causing it to strike the other bar, creating a two-tone sound ("ding-dong").

Many current A/V recording and communication doorbell systems (other than the present embodiments) are incompatible with existing wired doorbell systems of the type described in the preceding paragraph. One reason for this incompatibility is that the A/V recording and communication doorbell draws an amount of power from the household AC electrical power supply that is above the threshold necessary for causing the signaling device to sound. The A/V recording and communication doorbell thus causes frequent inadvertent sounding of the signaling device, which is not only bothersome to the home's occupant(s), but also undermines the usefulness of the doorbell. The present embodiments solve this problem by limiting the power consumption of the A/V recording and communication doorbell to an amount that is below the threshold necessary for causing the signaling device to sound. Embodiments of the present A/V recording and communication doorbell can thus be connected to the existing household AC power supply and the existing signaling device without causing inadvertent sounding of the signaling device.

Several advantages flow from the ability of the present embodiments to be connected to the existing household AC power supply. For example, the camera of the present A/V recording and communication doorbell can be powered on continuously. In a typical battery-powered A/V recording and communication doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer or sliding window. In some embodiments, about 10-15 seconds of recorded footage can be continuously stored in the rolling buffer or sliding window. Also, because the camera is able to be powered on continuously, it can be used for motion detection, thus eliminating any need for a separate motion detection device, such as a passive infrared sensor (PIR). Eliminating the PIR simplifies the design of the A/V recording and communication doorbell and enables the doorbell to be made more compact. Also, because the camera is able to be powered on continuously, it can be used as a light detector for use in controlling the current state of the IR cut filter and turning the IR LED on and off. Using the camera as a light detector eliminates any need for a separate light detector, thereby further simplifying the design of the A/V recording and communication doorbell and enabling the doorbell to be made even more compact.

Figure 3:
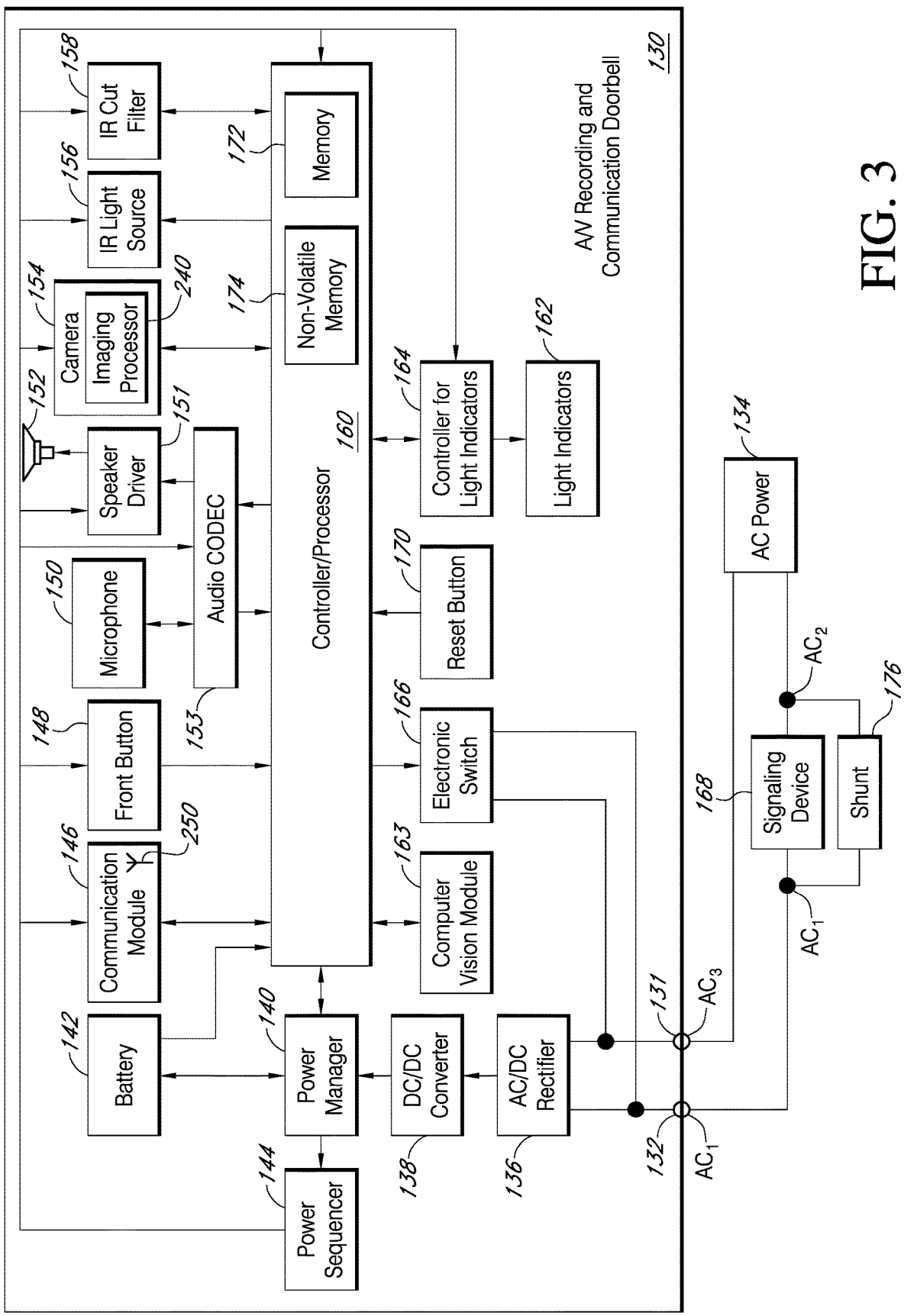
FIG. 3 is a functional block diagram illustrating an embodiment of an A/V recording and communication doorbell system according to the present disclosure.

FIGS. 3-13 illustrate one embodiment of a low-power-consumption A/V recording and communication doorbell 130 according to various aspects of the present disclosure. FIG. 3 is a functional block diagram illustrating various components of the A/V recording and communication doorbell 130 and their relationships to one another. For example, the A/V recording and communication doorbell 130 includes a pair of terminals 131, 132 configured to be connected to a source of external AC (alternating-current) power, such as a household AC power supply 134 (may also be referred to as AC mains). The AC power 134 may have a voltage in the range of 16-24 VAC, for example. The incoming AC power 134 may be converted to DC (direct-current) by an AC/DC rectifier 136. An output of the AC/DC rectifier 136 may be connected to an input of a DC/DC converter 138, which may step down the voltage from the output of the AC/DC rectifier 136 from 16-24 VDC to a lower voltage of about 5 VDC, for example. In various embodiments, the output of the DC/DC converter 138 may be in a range of from about 2.5 V to about 7.5 V, for example.

With further reference to FIG. 3, the output of the DC/DC converter 138 is connected to a power manager 140, which may comprise an integrated circuit including a processor core, memory, and/or programmable input/output peripherals. In one non-limiting example, the power manager 140 may be an off-the-shelf component, such as the BQ24773 chip manufactured by Texas Instruments. As described in detail below, the power manager 140 controls, among other things, an amount of power drawn from the external power supply 134, as well as an amount of supplemental power drawn from a battery 142, to power the A/V recording and communication doorbell 130. The power manager 140 may, for example, limit the amount of power drawn from the external power supply 134 so that a threshold power draw is not exceeded. In one non-limiting example, the threshold power, as measured at the output of the DC/DC converter 138, may be equal to 1.4 A. The power manager 140 may also control an amount of power drawn from the external power supply 134 and directed to the battery 142 for recharging of the battery 142. An output of the power manager 140 is connected to a power sequencer 144, which controls a sequence of power delivery to other components of the A/V recording and communication doorbell 130, including a communication module 146, a front button 148, a microphone 150, a speaker driver 151, a speaker 152, an audio CODEC (Coder-Decoder) 153, a camera 154, an infrared (IR) light source 156, an IR cut filter 158, a processor 160 (may also be referred to as a controller 160), a plurality of light indicators 162, and a controller 164 for the light indicators 162. Each of these components is described in detail below. The power sequencer 144 may comprise an integrated circuit including a processor core, memory, and/or programmable input/output peripherals. In one non-limiting example, the power sequencer 144 may be an off-the-shelf component, such as the RT5024 chip manufactured by Richtek.

With further reference to FIG. 3, the A/V recording and communication doorbell 130 further comprises an electronic switch 166 that closes when the front button 148 is depressed. When the electronic switch 166 closes, power from the AC power source 134 is diverted through a signaling device 168 that is external to the A/V recording and communication doorbell 130 to cause the signaling device 168 to emit a sound, as further described below. In one non-limiting example, the electronic switch 166 may be a triac device. The A/V recording and communication doorbell 130 further comprises a reset button 170 configured to initiate a hard reset of the processor 160, as further described below.

With further reference to FIG. 3, the processor 160 may perform data processing and various other functions, as described below. The processor 160 may comprise an integrated circuit including a processor core, memory 172, non-volatile memory 174, and/or programmable input/output peripherals (not shown). The memory 172 may comprise, for example, DDR3 (double data rate type three synchronous dynamic random-access memory). The non-volatile memory 174 may comprise, for example, NAND flash memory. In the embodiment illustrated in FIG. 3, the memory 172 and the non-volatile memory 174 are illustrated within the box representing the processor 160. It is to be understood that the embodiment illustrated in FIG. 3 is merely an example, and in some embodiments the memory 172 and/or the non-volatile memory 174 are not necessarily physically incorporated with the processor 160. The memory 172 and/or the non-volatile memory 174, regardless of their physical location, may be shared by one or more other components (in addition to the processor 160) of the present A/V recording and communication doorbell 130.

The transfer of digital audio between the user and a visitor may be compressed and decompressed using the audio CODEC 153, which is operatively coupled to the processor 160. When the visitor speaks, audio from the visitor is compressed by the audio CODEC 153, digital audio data is sent through the communication module 146 to the network 112 via the user's network 110, routed by the server 118 and delivered to the user's client device 114. When the user speaks, after being transferred through the network 112, the user's network 110, and the communication module 146, the digital audio data is decompressed by the audio CODEC 153 and emitted to the visitor through the speaker 152, which is driven by the speaker driver 151.

With further reference to FIG. 3, some of the present embodiments may include a shunt 176 connected in parallel with the signaling device 168. The shunt 176 facilitates the ability of the A/V recording and communication doorbell 130 to draw power from the AC power source 134 without inadvertently triggering the signaling device 168. The shunt 176, during normal standby operation, presents a relatively low electrical impedance, such as a few ohms, across the terminals of the signaling device 168. Most of the current drawn by the A/V recording and communication doorbell 130, therefore, flows through the shunt 176, and not through the signaling device 168. The shunt 176, however, contains electronic circuitry (described below) that switches the shunt 176 between a state of low impedance, such as a few ohms, for example, and a state of high impedance, such as >1K ohms, for example. When the front button 148 of the A/V recording and communication doorbell 130 is pressed, the electronic switch 166 closes, causing the voltage from the AC power source 134 to be impressed mostly across the shunt 176 and the signaling device 168 in parallel, while a small amount of voltage, such as about 1V, is impressed across the electronic switch 166. The circuitry in the shunt 176 senses this voltage, and switches the shunt 176 to the high impedance state, so that power from the AC power source 134 is diverted through the signaling device 168. The diverted AC power 134 is above the threshold necessary to cause the signaling device 168 to emit a sound. Pressing the front button 148 of the doorbell 130 therefore causes the signaling device 168 to "ring," alerting any person(s) within the structure to which the doorbell 130 is mounted that there is a visitor at the front door (or at another location corresponding to the location of the doorbell 130). In one non-limiting example, the electronic switch 166 may be a triac device.

Figure 4:
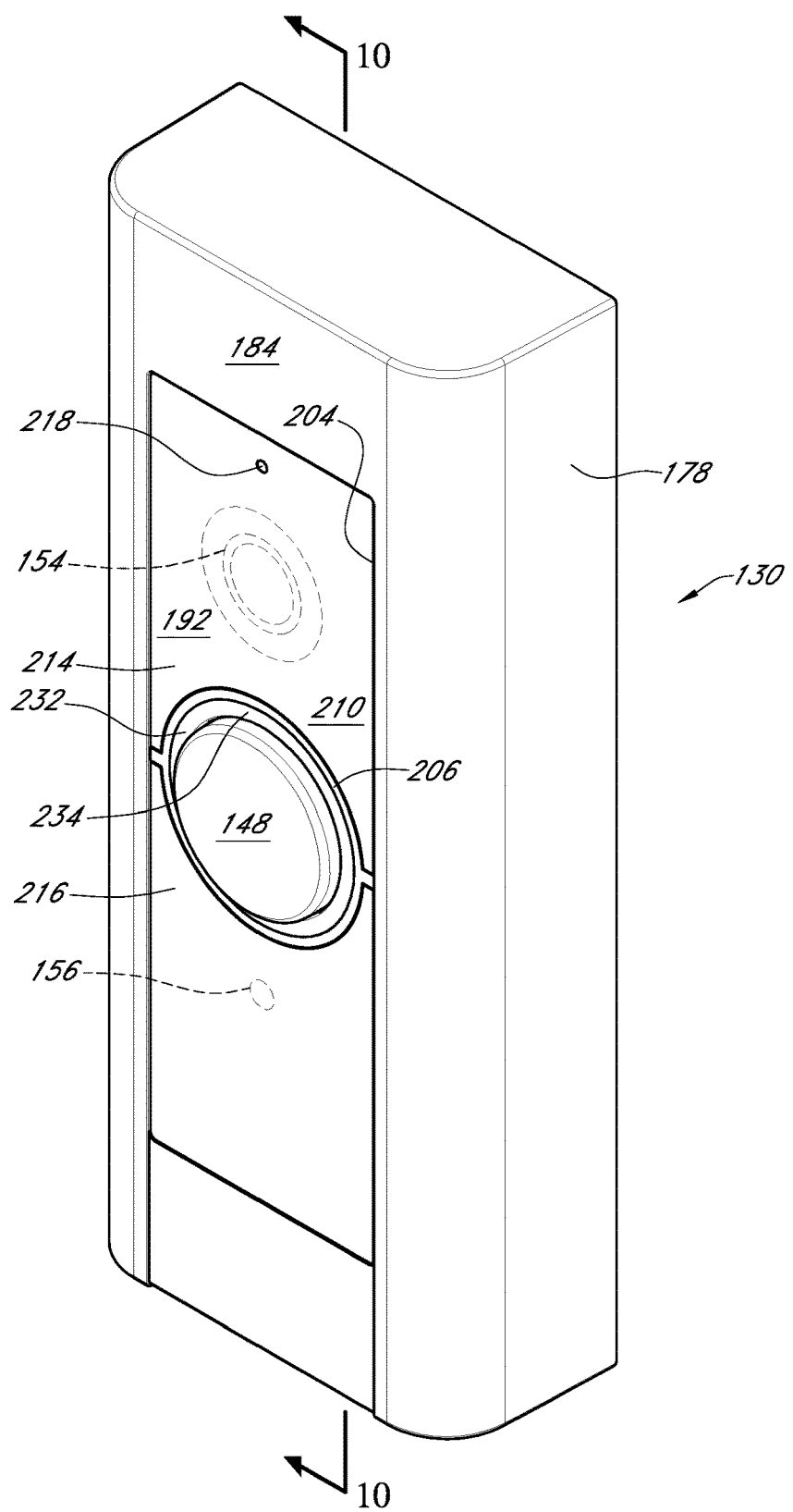
FIG. 4 is a front perspective view of an embodiment of an A/V recording and communication doorbell according to the present disclosure.
Figure 5:
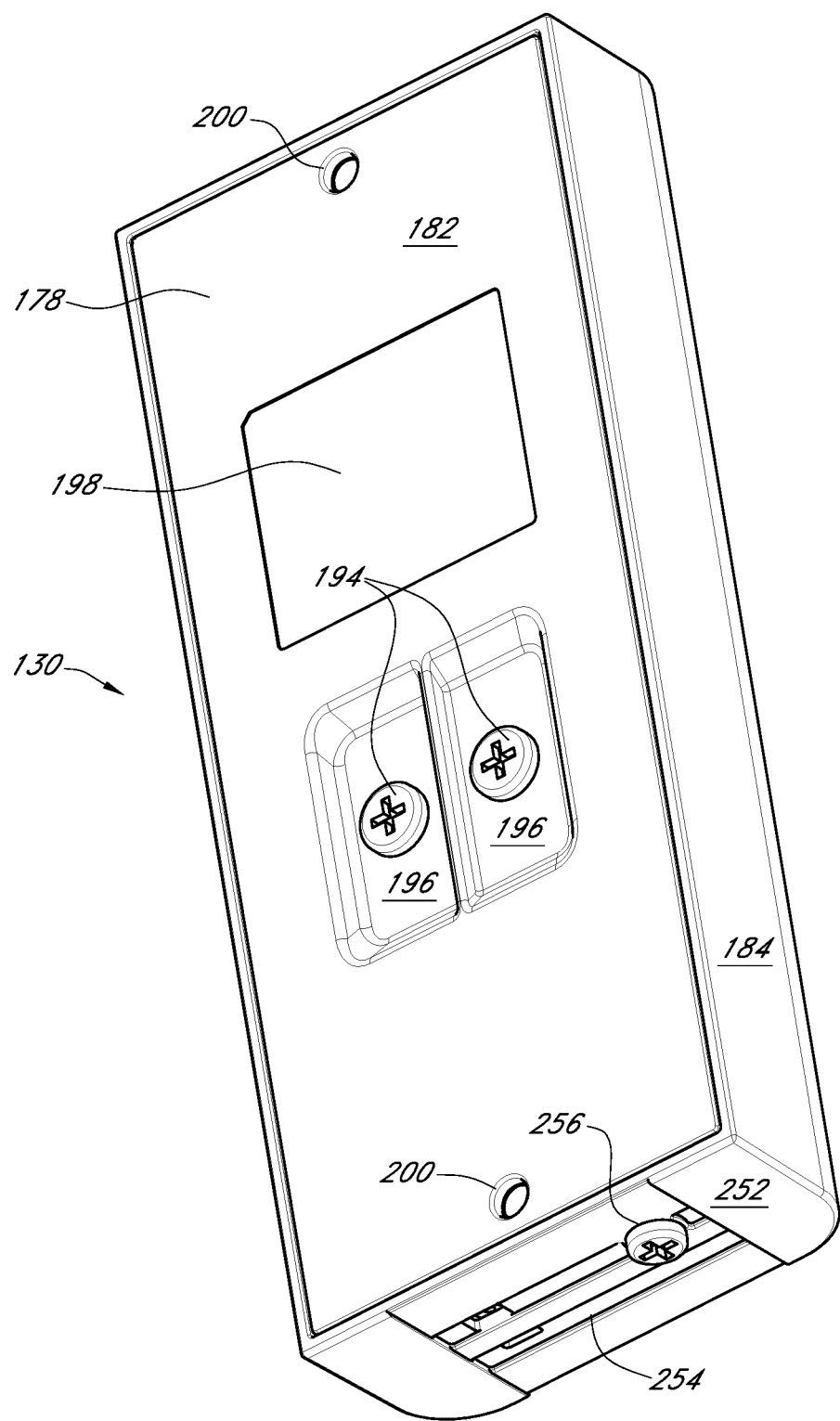
FIG. 5 is a rear perspective view of the A/V recording and communication doorbell of FIG. 4.
Figure 6:
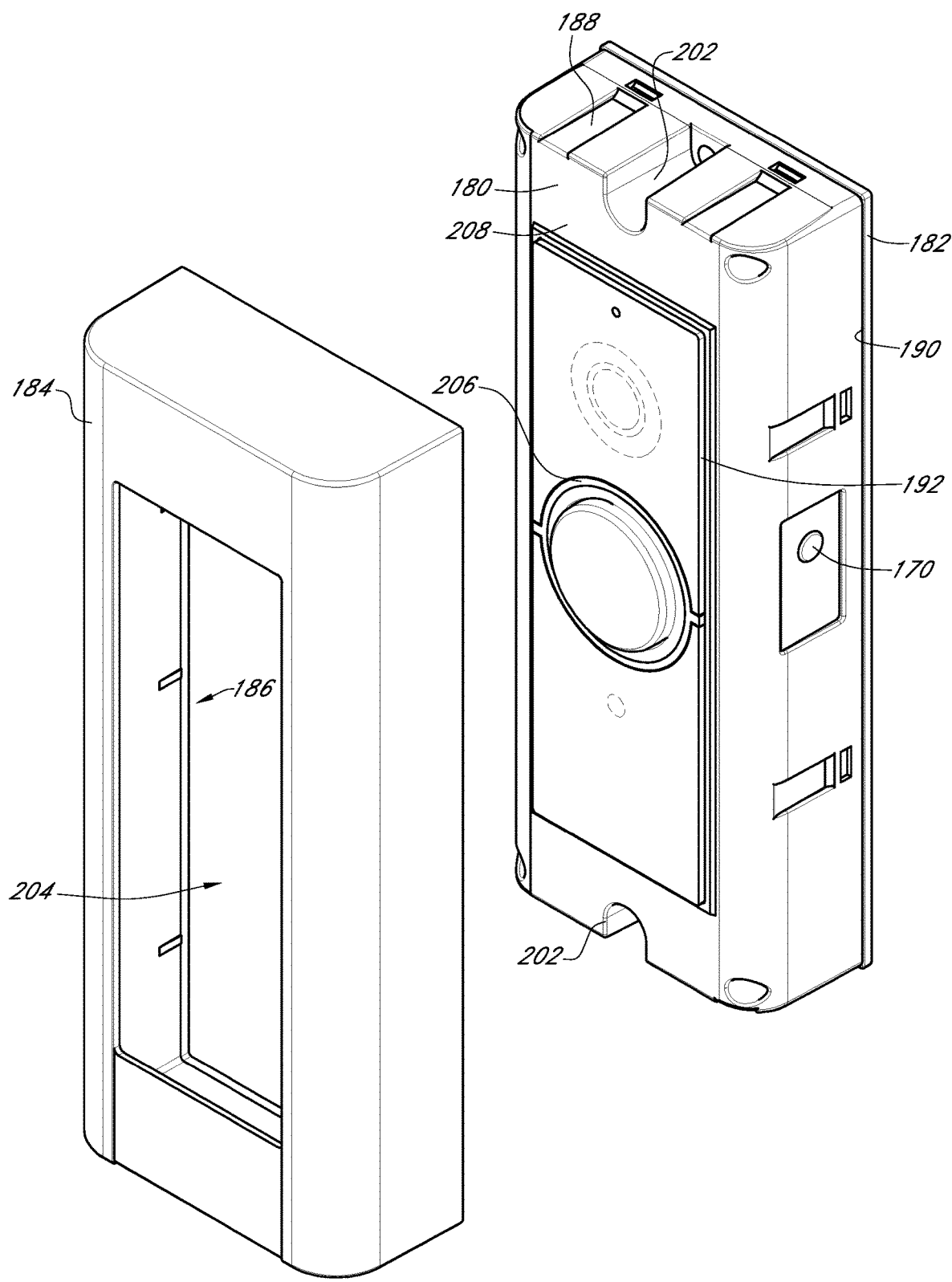
FIG. 6 is a partially exploded front perspective view of the A/V recording and communication doorbell of FIG. 4 showing the cover removed.

With reference to FIGS. 4-6, the A/V recording and communication doorbell 130 further comprises a housing 178 having an enclosure 180 (FIG. 6), a back plate 182 secured to the rear of the enclosure 180, and a shell 184 overlying the enclosure 180. With reference to FIG. 6, the shell 184 includes a recess 186 that is sized and shaped to receive the enclosure 180 in a close-fitting engagement, such that outer surfaces of the enclosure 180 abut conforming inner surfaces of the shell 184. Exterior dimensions of the enclosure 180 may be closely matched with interior dimensions of the shell 184 such that friction maintains the shell 184 about the enclosure 180. Alternatively, or in addition, the enclosure 180 and/or the shell 184 may include mating features 188, such as one or more tabs, grooves, slots, posts, etc. to assist in maintaining the shell 184 about the enclosure 180. The back plate 182 is sized and shaped such that the edges of the back plate 182 extend outward from the edges of the enclosure 180, thereby creating a lip 190 against which the shell 184 abuts when the shell 184 is mated with the enclosure 180, as shown in FIGS. 4 and 5. In some embodiments, multiple shells 184 in different colors may be provided so that the end user may customize the appearance of his or her A/V recording and communication doorbell 130. For example, the A/V recording and communication doorbell 130 may be packaged and sold with multiple shells 184 in different colors in the same package.

With reference to FIG. 4, a front surface of the A/V recording and communication doorbell 130 includes the button 148 (may also be referred to as front button 148, FIG. 3), which is operatively connected to the processor 160. In a process similar to that described above with reference to FIG. 2, when a visitor presses the front button 148, an alert may be sent to the user's client device to notify the user that someone is at his or her front door (or at another location corresponding to the location of the A/V recording and communication doorbell 130). With further reference to FIG. 4, the A/V recording and communication doorbell 130 further includes the camera 154, which is operatively connected to the processor 160, and which is located behind a shield 192. As described in detail below, the camera 154 is configured to capture video images from within its field of view. Those video images can be streamed to the user's client device and/or uploaded to a remote network device for later viewing according to a process similar to that described above with reference to FIG. 2.

With reference to FIG. 5, a pair of terminal screws 194 extends through the back plate 182. The terminal screws 194 are connected at their inner ends to the terminals 131, 132 (FIG. 3) within the A/V recording and communication doorbell 130. The terminal screws 194 are configured to receive electrical wires to connect to the A/V recording and communication doorbell 130, through the terminals 131, 132, to the household AC power supply 134 of the structure on which the A/V recording and communication doorbell 130 is mounted. In the illustrated embodiment, the terminal screws 194 are located within a recessed portion 196 of the rear surface 198 of the back plate 182 so that the terminal screws 194 do not protrude from the outer envelope of the A/V recording and communication doorbell 130. The A/V recording and communication doorbell 130 can thus be mounted to a mounting surface with the rear surface 198 of the back plate 182 abutting the mounting surface. The back plate 182 includes apertures 200 adjacent its upper and lower edges to accommodate mounting hardware, such as screws (not shown), for securing the back plate 182 (and thus the A/V recording and communication doorbell 130) to the mounting surface. With reference to FIG. 6, the enclosure 180 includes corresponding apertures 202 adjacent its upper and lower edges that align with the apertures 200 in the back plate 182 to accommodate the mounting hardware. In certain embodiments, the A/V recording and communication doorbell 130 may include a mounting plate or bracket (not shown) to facilitate securing the A/V recording and communication doorbell 130 to the mounting surface.

Figure 10:
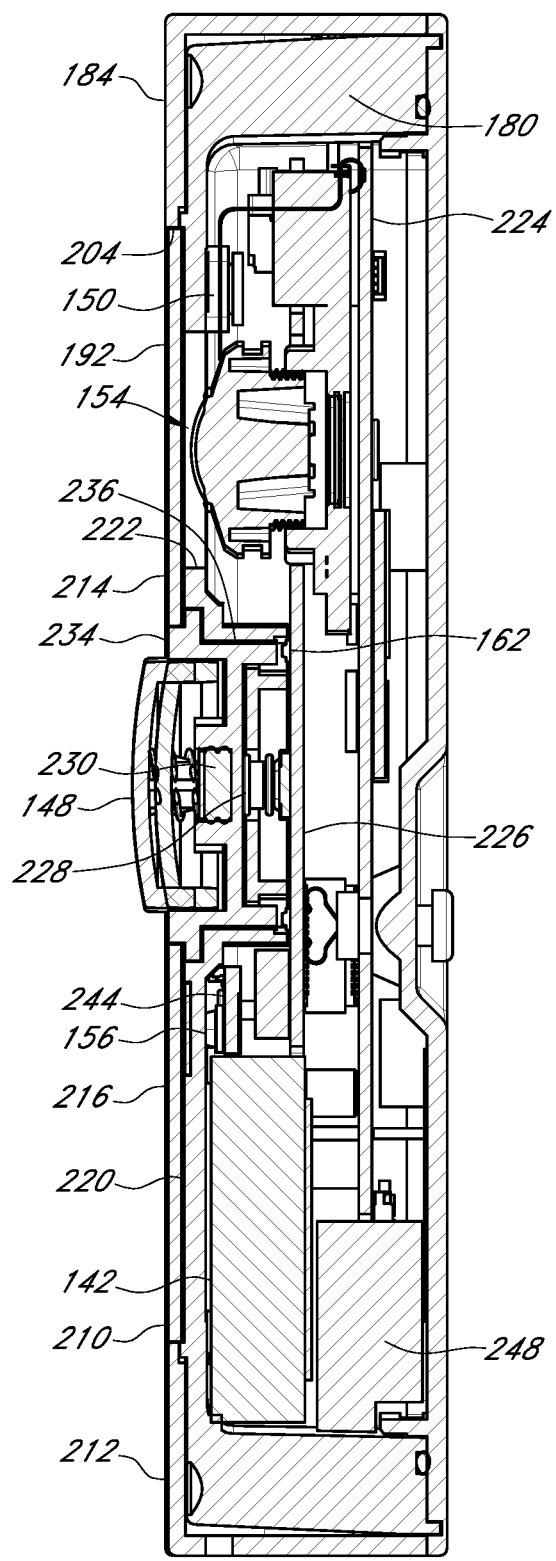
FIG. 10 is a right-side cross-sectional view of the A/V recording and communication doorbell of FIG. 4 taken through the line 10-10 in FIG. 4.

With further reference to FIG. 6, the shell 184 includes a central opening 204 in a front surface. The central opening 204 is sized and shaped to accommodate the shield 192. In the illustrated embodiment, the shield 192 is substantially rectangular, and includes a central opening 206 through which the front button 148 protrudes. The shield 192 defines a plane parallel to and in front of a front surface 208 of the enclosure 180. When the shell 184 is mated with the enclosure 180, as shown in FIGS. 4 and 10, the shield 192 resides within the central opening 204 of the shell 184 such that a front surface 210 of the shield 192 is substantially flush with a front surface 212 of the shell 184 and there is little or no gap (FIG. 4) between the outer edges of the shield 192 and the inner edges of the central opening 204 in the shell 184.

With further reference to FIG. 6, the shield 192 includes an upper portion 214 (located above and to the sides of the front button 148) and a lower portion 216 (located below and to the sides of the front button 148). The upper and lower portions 214, 216 of the shield 192 may be separate pieces, and may comprise different materials. The upper portion 214 of the shield 192 may be transparent or translucent so that it does not interfere with the field of view of the camera 154. For example, in certain embodiments the upper portion 214 of the shield 192 may comprise glass or plastic. As described in detail below, the microphone 150, which is operatively connected to the processor 160, is located behind the upper portion 214 of the shield 192. The upper portion 214, therefore, may include an opening 218 that facilitates the passage of sound through the shield 192 so that the microphone 150 is better able to pick up sounds from the area around the A/V recording and communication doorbell 130.

The lower portion 216 of the shield 192 may comprise a material that is substantially transparent to infrared (IR) light, but partially or mostly opaque with respect to light in the visible spectrum. For example, in certain embodiments the lower portion 216 of the shield 192 may comprise a plastic, such as polycarbonate. The lower portion 216 of the shield 192, therefore, does not interfere with transmission of IR light from the IR light source 156, which is located behind the lower portion 216. As described in detail below, the IR light source 156 and the IR cut filter 158, which are both operatively connected to the processor 160, facilitate "night vision" functionality of the camera 154.

The upper portion 214 and/or the lower portion 216 of the shield 192 may abut an underlying cover 220 (FIG. 10), which may be integral with the enclosure 180 or may be a separate piece. The cover 220, which may be opaque, may include a first opening 222 corresponding to the location of the camera 154, a second opening (not shown) corresponding to the location of the microphone 150 and the opening 218 in the upper portion 214 of the shield 192, and a third opening (not shown) corresponding to the location of the IR light source 156.

Figure 7:
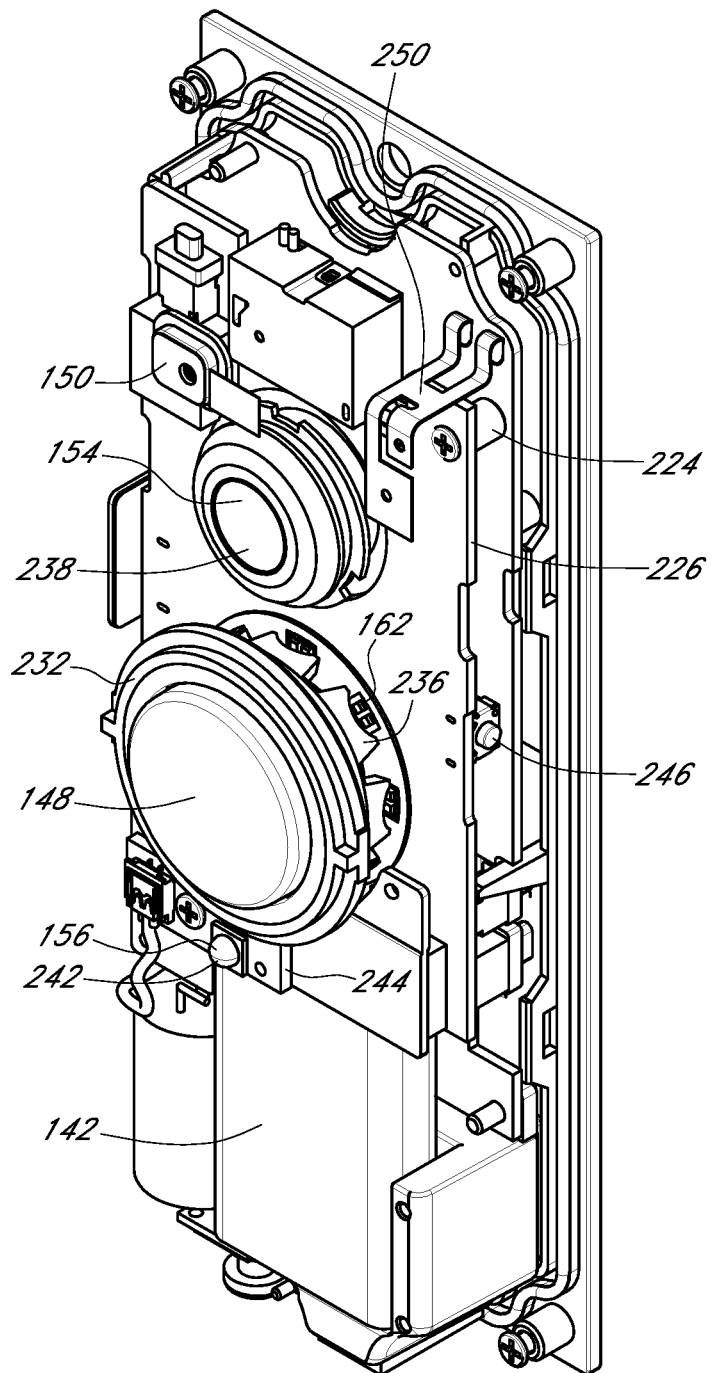
FIGS. 7, 8, and 9 are front perspective views of various internal components of the A/V recording and communication doorbell of FIG. 4.
Figure 8:
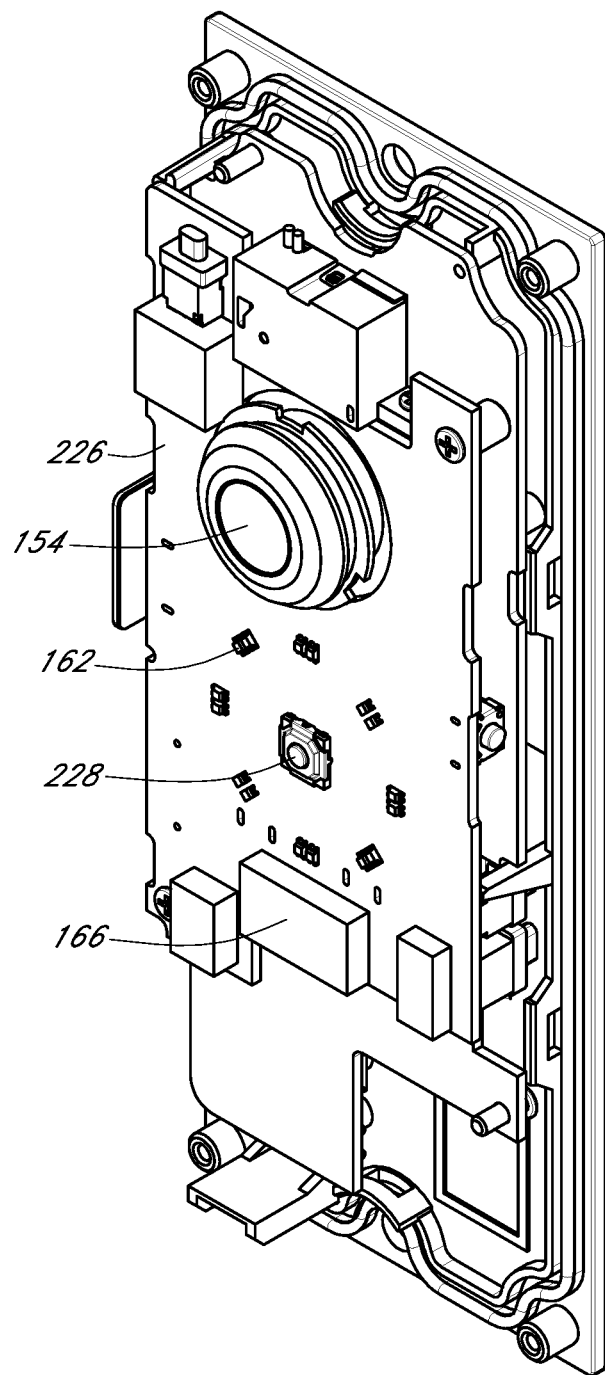
Figure 9:
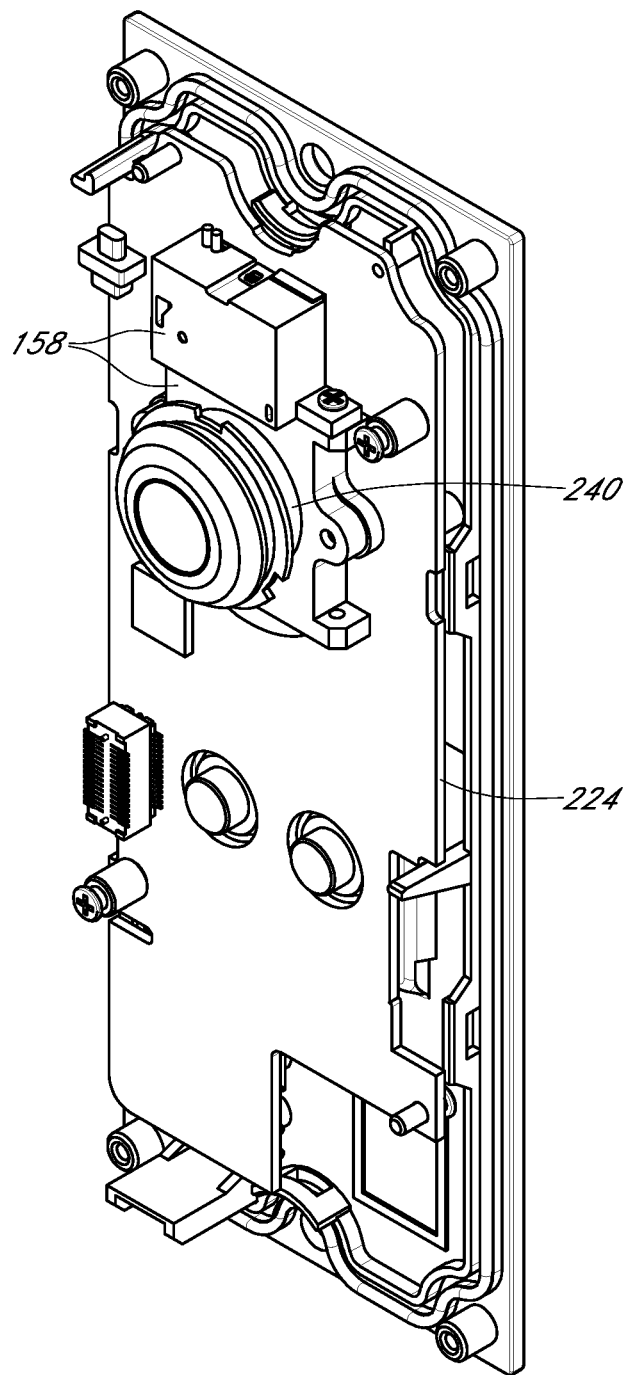

FIGS. 7-10 illustrate various internal components of the A/V recording and communication doorbell 130. FIGS. 7-9 are front perspective views of the doorbell 130 with the shell 184 and the enclosure 180 removed, while FIG. 10 is a right-side cross-sectional view of the doorbell 130 taken through the line 10-10 in FIG. 4. With reference to FIGS. 7 and 8, the A/V recording and communication doorbell 130 further comprises a main printed circuit board (PCB) 224 and a front PCB 226. With reference to FIG. 8, the front PCB 226 comprises a button actuator 228. With reference to FIGS. 7, 8, and 10, the front button 148 is located in front of the button actuator 228. The front button 148 includes a stem 230 (FIG. 10) that extends into the housing 178 to contact the button actuator 228. When the front button 148 is pressed, the stem 230 depresses the button actuator 228, thereby closing the electronic switch 166 (FIG. 8), as described below.

With reference to FIG. 8, the front PCB 226 further comprises the light indicators 162, which may illuminate when the front button 148 of the doorbell 130 is pressed. In the illustrated embodiment, the light indicators 162 comprise light-emitting diodes (LEDs 162) that are surface mounted to the front surface of the front PCB 226 and are arranged in a circle around the button actuator 228. The present embodiments are not limited to the light indicators 162 being LEDs, and in alternative embodiments the light indicators 162 may comprise any other type of light-emitting device. The present embodiments are also not limited by the number of light indicators 162 shown in FIG. 8, nor by the pattern in which they are arranged.

With reference to FIG. 7, the doorbell 130 further comprises a light pipe 232. The light pipe 232 is a transparent or translucent ring that encircles the front button 148. With reference to FIG. 4, the light pipe 232 resides in an annular space between the front button 148 and the central opening 206 in the shield 192, with a front surface 234 of the light pipe 232 being substantially flush with the front surface 210 of the shield 192. With reference to FIGS. 7 and 10, a rear portion of light pipe 232 includes a plurality of posts 236 whose positions correspond to the positions of the LEDs 162. When the LEDs 162 are illuminated, light is transmitted through the posts 236 and the body of the light pipe 232 so that the light is visible at the front surface 234 of the light pipe 232. The LEDs 162 and the light pipe 232 thus provide a ring of illumination around the front button 148. The light pipe 232 may comprise a plastic, for example, or any other suitable material capable of transmitting light.

The LEDs 162 and the light pipe 232 may function as visual indicators for a visitor and/or a user. For example, the LEDs 162 may illuminate upon activation or stay illuminated continuously. In one aspect, the LEDs 162 may change color to indicate that the front button 148 has been pressed. The LEDs 162 may also indicate that the battery 142 needs recharging, or that the battery 142 is currently being charged, or that charging of the battery 142 has been completed. The LEDs 162 may indicate that a connection to the user's wireless network is good, limited, poor, or not connected. The LEDs 162 may be used to guide the user through setup or installation steps using visual cues, potentially coupled with audio cues emitted from the speaker 152.

With further reference to FIG. 7, the A/V recording and communication doorbell 130 further comprises a rechargeable battery 142. As described in further detail below, the A/V recording and communication doorbell 130 is connected to an external power source 134 (FIG. 3), such as AC mains. The A/V recording and communication doorbell 130 is primarily powered by the external power source 134, but may also draw power from the rechargeable battery 142 so as not to exceed a threshold amount of power from the external power source 134, to thereby avoid inadvertently sounding the signaling device 168. With reference to FIG. 3, the battery 142 is operatively connected to the power manager 140. As described below, the power manager 140 controls an amount of power drawn from the battery 142 to supplement the power drawn from the external AC power source 134 to power the A/V recording and communication doorbell 130 when supplemental power is needed. The power manager 140 also controls recharging of the battery 142 using power drawn from the external power source 134. The battery 142 may comprise, for example, a lithium-ion battery, or any other type of rechargeable battery.

With further reference to FIG. 7, the A/V recording and communication doorbell 130 further comprises the camera 154. The camera 154 is coupled to a front surface of the front PCB 226, and includes a lens 238 and an imaging processor 240 (FIG. 9). The camera lens 238 may be a lens capable of focusing light into the camera 154 so that clear images may be captured. The camera 154 may comprise, for example, a high definition (HD) video camera, such as one capable of capturing video images at an image display resolution of 720p or better. In certain of the present embodiments, the camera 154 may be used to detect motion within its field of view, as described below.

With further reference to FIG. 7, the A/V recording and communication doorbell 130 further comprises an infrared (IR) light source 242. In the illustrated embodiment, the IR light source 242 comprises an IR light-emitting diode (LED) 242 coupled to an IR LED printed circuit board (PCB) 244. In alternative embodiments, the IR LED 242 may not comprise a separate PCB 244, and may, for example, be coupled to the front PCB 226.

With reference to FIGS. 7 and 10, the IR LED PCB 244 is located below the front button 148 (FIG. 7) and behind the lower portion 216 of the shield 192 (FIG. 10). As described above, the lower portion 216 of the shield 192 is transparent to IR light, but may be opaque with respect to light in the visible spectrum.

The IR LED 242 may be triggered to activate when a low level of ambient light is detected. When activated, IR light emitted from the IR LED 242 illuminates the camera 154's field of view. The camera 154, which may be configured to detect IR light, may then capture the IR light emitted by the IR LED 242 as it reflects off objects within the camera 154's field of view, so that the A/V recording and communication doorbell 130 can clearly capture images at night (may be referred to as "night vision").

With reference to FIG. 9, the A/V recording and communication doorbell 130 further comprises an IR cut filter 158. The IR cut filter 158 is a mechanical shutter that can be selectively positioned between the lens 238 and the image sensor of the camera 154. During daylight hours, or whenever there is a sufficient amount of ambient light, the IR cut filter 158 is positioned between the lens 238 and the image sensor to filter out IR light so that it does not distort the colors of images as the human eye sees them. During nighttime hours, or whenever there is little to no ambient light, the IR cut filter 158 is withdrawn from the space between the lens 238 and the image sensor, so that the camera 154 is sensitive to IR light ("night vision"). In some embodiments, the camera 154 acts as a light detector for use in controlling the current state of the IR cut filter 158 and turning the IR LED 242 on and off. Using the camera 154 as a light detector is facilitated in some embodiments by the fact that the A/V recording and communication doorbell 130 is powered by a connection to AC mains, and the camera 154, therefore, is always powered on. In other embodiments, however, the A/V recording and communication doorbell 130 may include a light sensor separate from the camera 154 for use in controlling the IR cut filter 158 and the IR LED 242.

With reference back to FIG. 6, the A/V recording and communication doorbell 130 further comprises a reset button 170. The reset button 170 contacts a reset button actuator 246 (FIG. 8) coupled to the front PCB 226. When the reset button 170 is pressed, it may contact the reset button actuator 246, which may trigger the erasing of any data stored at the non-volatile memory 174 and/or at the memory 172 (FIG. 3), and/or may trigger a reboot of the processor 160.

Figure 11:
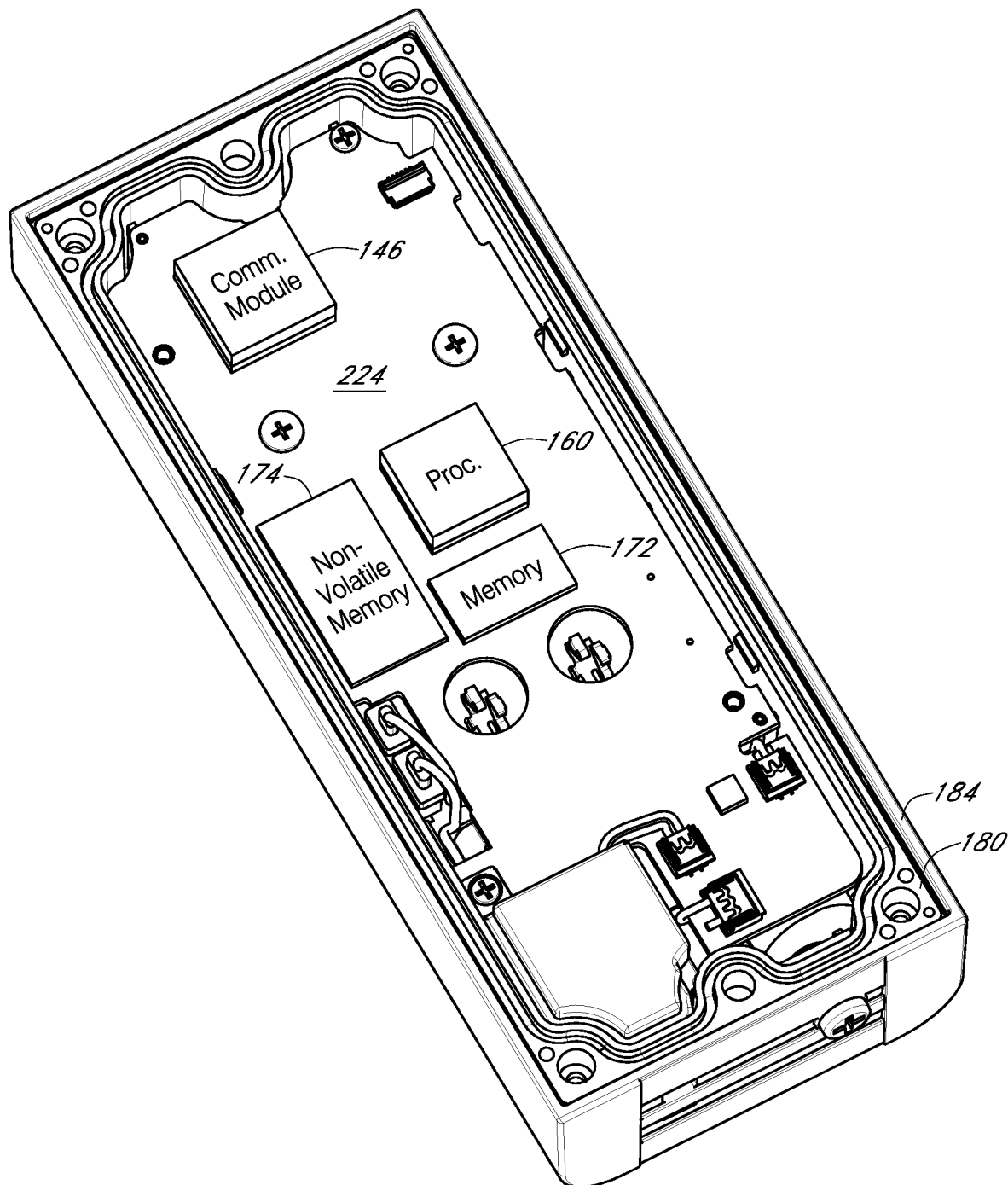
FIGS. 11-13 are rear perspective views of various internal components of the A/V recording and communication doorbell of FIG. 4.
Figure 12:
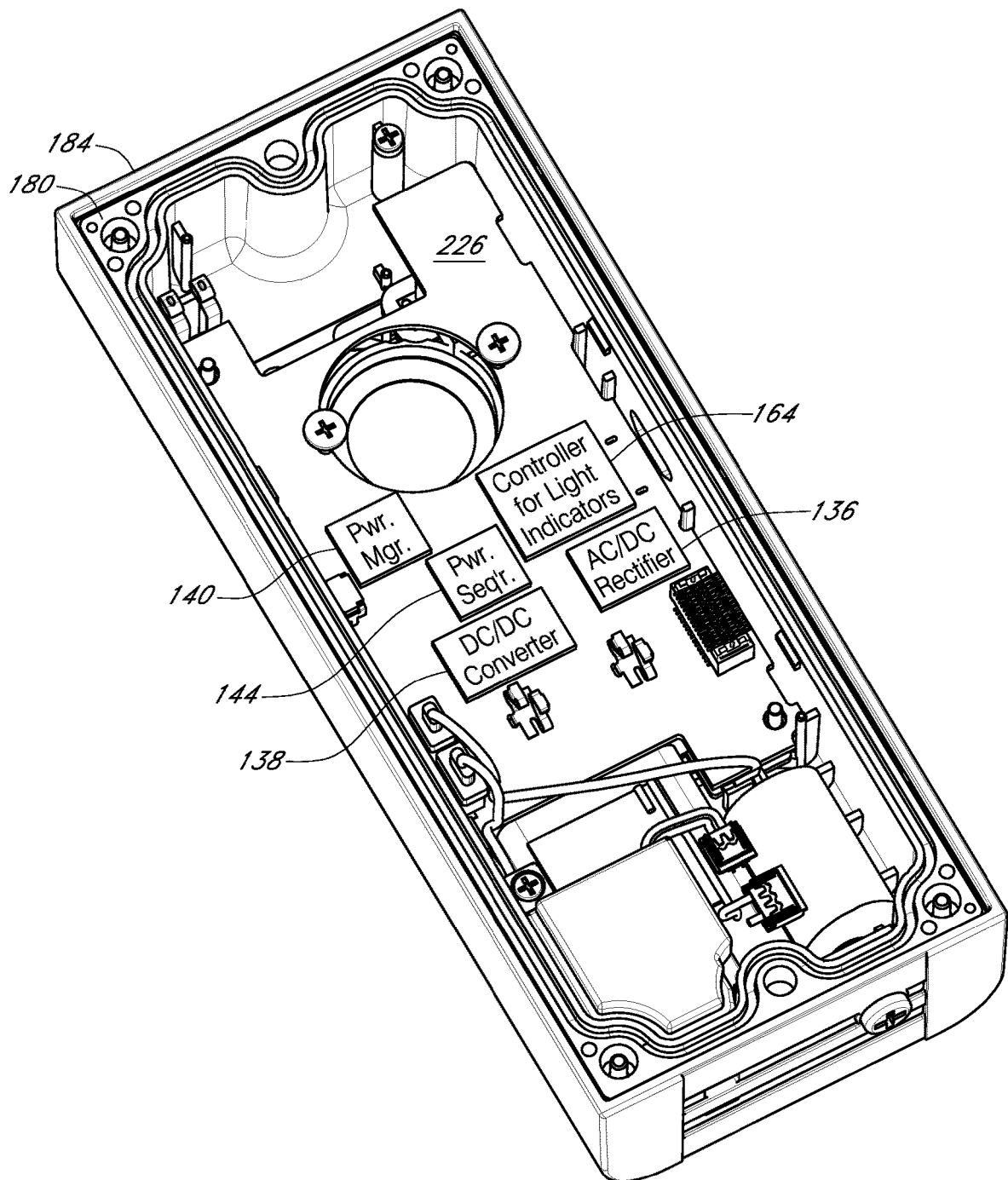
Figure 13:
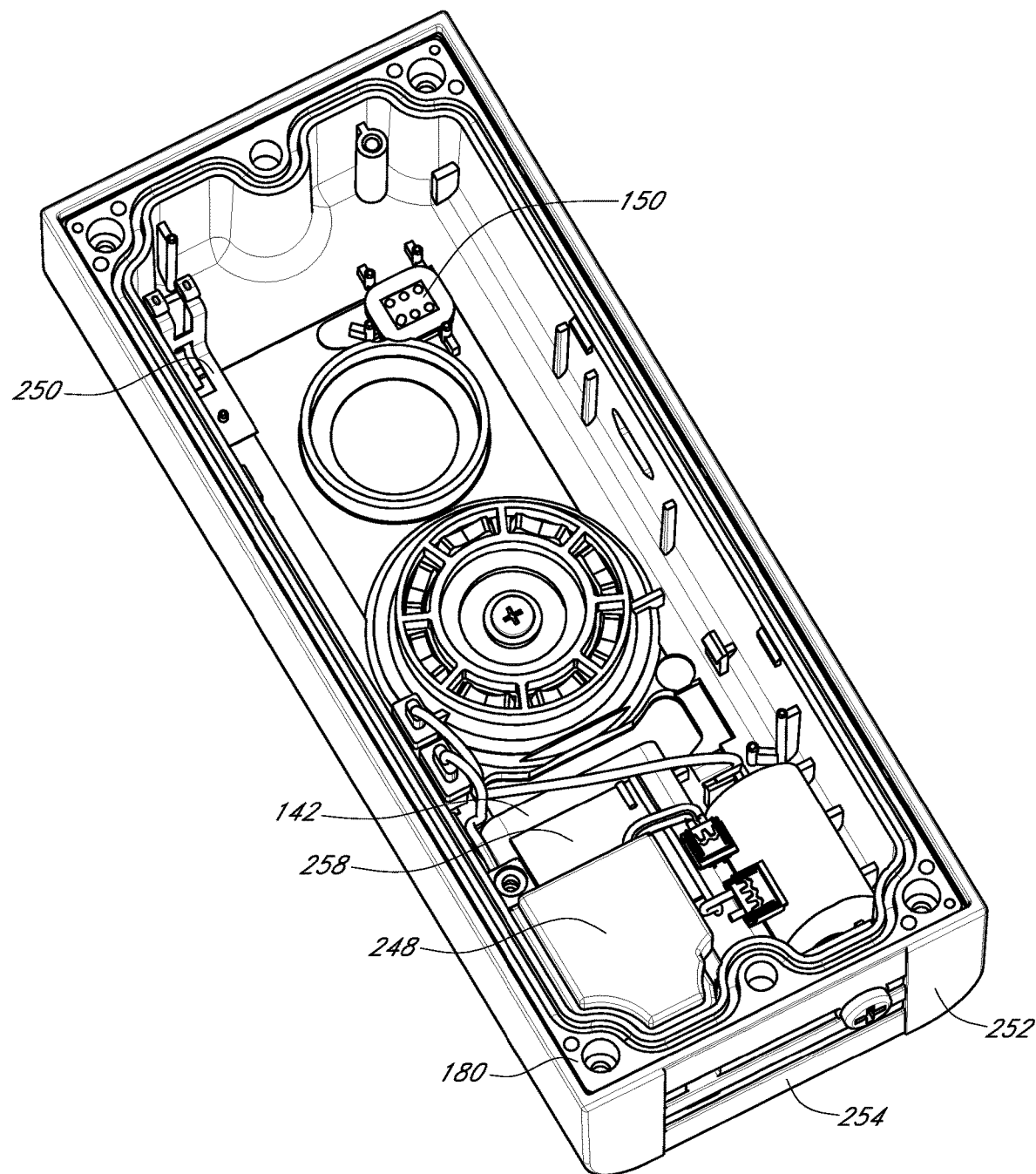

FIGS. 11-13 further illustrate internal components of the A/V recording and communication doorbell 130. FIGS. 11-13 are rear perspective views of the doorbell 130 with the back plate 182 and additional components removed. For example, in FIG. 11 the back plate 182 is removed, while in FIG. 12 the back plate 182 and the main PCB 224 are removed, and in FIG. 13 the back plate 182, the main PCB 224, and the front PCB 226 are removed. With reference to FIG. 11, several components are coupled to the rear surface of the main PCB 224, including the communication module 146, the processor 160, memory 172, and non-volatile memory 174. The functions of each of these components are described below. With reference to FIG. 12, several components are coupled to the rear surface of the front PCB 226, including the power manager 140, the power sequencer 144, the AC/DC rectifier 136, the DC/DC converter 138, and the controller 164 for the light indicators 162. The functions of each of these components are also described below. With reference to FIG. 13, several components are visible within the enclosure 180, including the microphone 150, a speaker chamber 248 (in which the speaker 152 is located), and an antenna 250 for the communication module 146. The functions of each of these components are also described below.

With reference to FIG. 7, the antenna 250 is coupled to the front surface of the main PCB 224 and operatively connected to the communication module 146, which is coupled to the rear surface of the main PCB 224 (FIG. 11). The microphone 150, which may also be coupled to the front surface of the main PCB 224, is located near the opening 218 (FIG. 4) in the upper portion 214 of the shield 192 so that sounds emanating from the area around the A/V recording and communication doorbell 130 can pass through the opening 218 and be detected by the microphone 150. With reference to FIG. 13, the speaker chamber 248 is located near the bottom of the enclosure 180. The speaker chamber 248 comprises a hollow enclosure in which the speaker 152 is located. The hollow speaker chamber 248 amplifies the sounds made by the speaker 152 so that they can be better heard by a visitor in the area near the A/V recording and communication doorbell 130. With reference to FIGS. 5 and 13, the lower surface 252 of the shell 184 and the lower surface (not shown) of the enclosure 180 may include an acoustical opening 254 through which the sounds made by the speaker 152 can pass so that they can be better heard by a visitor in the area near the A/V recording and communication doorbell 130. In the illustrated embodiment, the acoustical opening 254 is shaped generally as a rectangle having a length extending substantially across the lower surface 252 of the shell 184 (and also the enclosure 180). The illustrated shape is, however, just one example. With reference to FIG. 5, the lower surface 252 of the shell 184 may further include an opening 256 for receiving a security screw (not shown). The security screw may extend through the opening 256 and into a similarly located opening in the enclosure 180 to secure the shell 184 to the enclosure 180. If the doorbell 130 is mounted to a mounting bracket (not shown), the security screw may also maintain the doorbell 130 on the mounting bracket.

With reference to FIG. 13, the A/V recording and communication doorbell 130 may further include a battery heater 258. The present A/V recording and communication doorbell 130 is configured for outdoor use, including in cold climates. Cold temperatures, however, can cause negative performance issues for rechargeable batteries, such as reduced energy capacity, increased internal resistance, reduced ability to charge without damage, and reduced ability to supply load current. The battery heater 258 helps to keep the rechargeable battery 142 warm in order to reduce or eliminate the foregoing negative performance issues. In the illustrated embodiment, the battery heater 258 comprises a substantially flat, thin sheet abutting a side surface of the rechargeable battery 142. The battery heater 258 may comprise, for example, an electrically resistive heating element that produces heat when electrical current is passed through it. The battery heater 258 may thus be operatively coupled to the power manager 140 and/or the power sequencer 144 (FIG. 12). In some embodiments, the rechargeable battery 142 may include a thermally sensitive resistor ("thermistor," not shown) operatively connected to the processor 160 so that the battery 142's temperature can be monitored, and the amount of power supplied to the battery heater 258 can be adaptively controlled to keep the rechargeable battery 142 within a desired temperature range.

As described above, the present embodiments advantageously limit the power consumption of the A/V recording and communication doorbell to an amount that is below the threshold necessary for causing the signaling device to sound (except when the front button of the doorbell is pressed). The present A/V recording and communication doorbell can thus be connected to the existing household AC power supply and the existing signaling device without causing inadvertent sounding of the signaling device.

Several advantages flow from the ability of the present embodiments to be connected to the existing household AC power supply. For example, the camera of the present A/V recording and communication doorbell can be powered on continuously. In a typical battery-powered A/V recording and communication doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer or sliding window. In some embodiments, about 10-15 seconds of recorded footage can be continuously stored in the rolling buffer or sliding window. Also, because the camera is able to be powered on continuously, it can be used for motion detection, thus eliminating any need for a separate motion detection device, such as a passive infrared sensor (PIR). Eliminating the PIR simplifies the design of the A/V recording and communication doorbell and enables the doorbell to be made more compact, although in some alternative embodiments the doorbell may include one or more PIRs and/or other motion detectors, heat source detectors, etc. Also, because the camera is able to be powered on continuously, it can be used as a light detector for use in controlling the current state of the IR cut filter and turning the IR LED on and off. Using the camera as a light detector eliminates any need for a separate light detector, thereby further simplifying the design of the A/V recording and communication doorbell and enabling the doorbell to be made even more compact, although in some alternative embodiments the doorbell may include a separate light detector.

Figure 14:
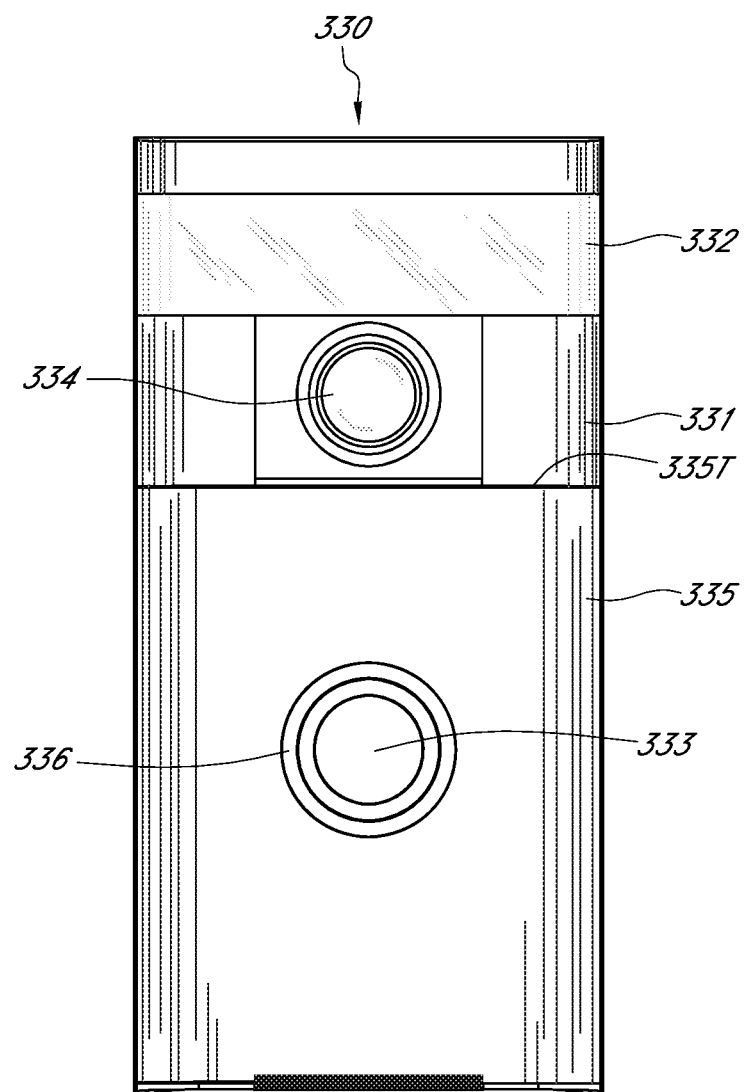
FIG. 14 is a front view of an A/V recording and communication device according to various aspects of the present disclosure.
Figure 15:
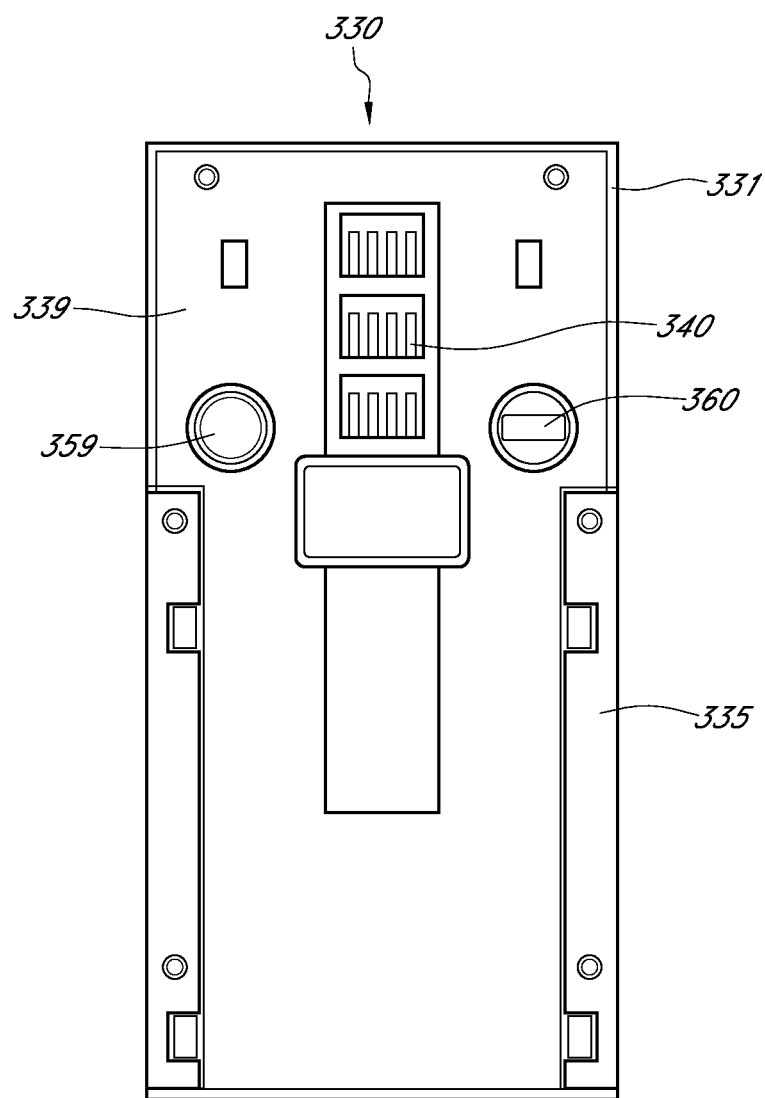
FIG. 15 is a rear view of the A/V recording and communication device of FIG. 14.
Figure 16:
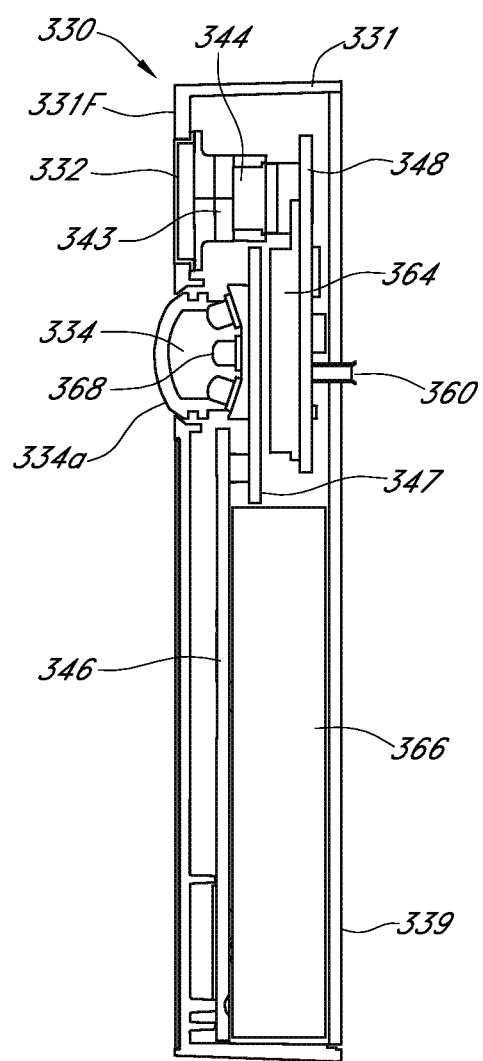
FIG. 16 is right-side cross-sectional view of the A/V recording and communication device of FIG. 14.
Figure 17:
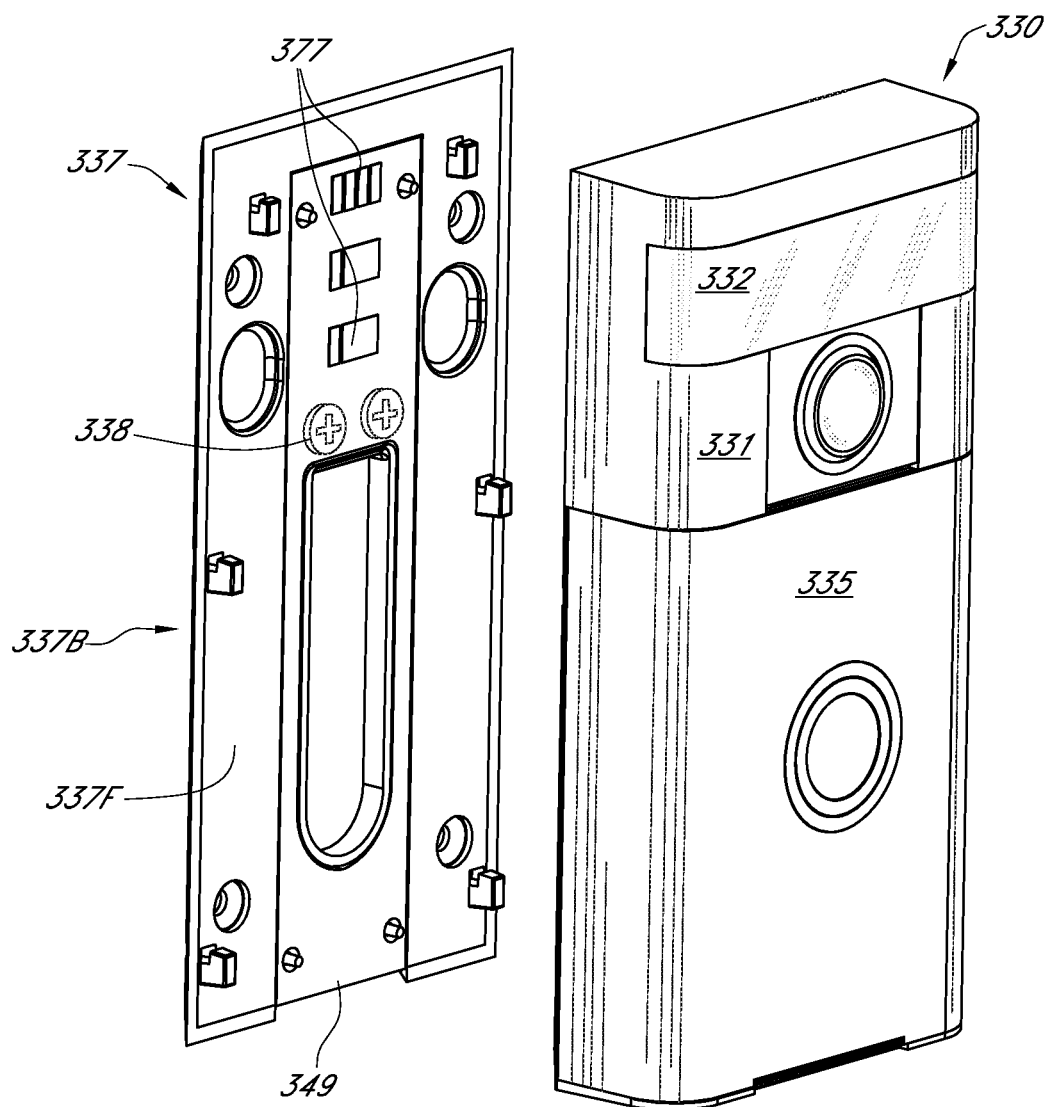
FIG. 17 is an exploded view of the A/V recording and communication device of FIG. 14 and a mounting bracket.

FIGS. 14-18 illustrate another embodiment of a wireless audio/video (A/V) communication doorbell 330 according to an aspect of present embodiments. FIG. 14 is a front view, FIG. 15 is a rear view, FIG. 16 is a right-side cross-sectional view, and FIG. 17 is an exploded view of the doorbell 330 and a mounting bracket 337. As described below, the doorbell 330 is configured to be connected to an external power source, such as household wiring, but is also configured to be powered by an on-board rechargeable battery instead of, or in addition to, the external power source.

The doorbell 330 includes a faceplate 335 mounted to a back plate 339 (FIG. 15). With reference to FIG. 16, the faceplate 335 has a substantially flat profile. The faceplate 335 may comprise any suitable material, including, without limitation, metals, such as brushed aluminum or stainless steel, metal alloys, or plastics. The faceplate 335 protects the internal contents of the doorbell 330 and serves as an exterior front surface of the doorbell 330.

With reference to FIG. 14, the faceplate 335 includes a button 333 and a light pipe 336. The button 333 and the light pipe 336 may have various profiles that may or may not match the profile of the faceplate 335. The light pipe 336 may comprise any suitable material, including, without limitation, transparent plastic, that is capable of allowing light produced within the doorbell 330 to pass through. The light may be produced by one or more light-emitting components, such as light-emitting diodes (LED's), contained within the doorbell 330, as further described below. The button 333 may make contact with a button actuator (not shown) located within the doorbell 330 when the button 333 is pressed by a visitor. When pressed, the button 333 may trigger one or more functions of the doorbell 330, as further described below.

With reference to FIGS. 3 and 4, the doorbell 330 further includes an enclosure 331 that engages the faceplate 335. In the illustrated embodiment, the enclosure 331 abuts an upper edge 335T (FIG. 14) of the faceplate 335, but in alternative embodiments one or more gaps between the enclosure 331 and the faceplate 335 may facilitate the passage of sound and/or light through the doorbell 330. The enclosure 331 may comprise any suitable material, but in some embodiments the material of the enclosure 331 preferably permits infrared light to pass through from inside the doorbell 330 to the environment and vice versa. The doorbell 330 further includes a lens 332. In some embodiments, the lens may comprise a Fresnel lens, which may be patterned to deflect incoming light into one or more infrared sensors located within the doorbell 330. The doorbell 330 further includes a camera 334, which captures video data when activated, as described below.

FIG. 15 is a rear view of the doorbell 330, according to an aspect of the present embodiments. As illustrated, the enclosure 331 may extend from the front of the doorbell 330 around to the back thereof and may fit snugly around a lip of the back plate 339. The back plate 339 may comprise any suitable material, including, without limitation, metals, such as brushed aluminum or stainless steel, metal alloys, or plastics. The back plate 339 protects the internal contents of the doorbell 330 and serves as an exterior rear surface of the doorbell 330. The faceplate 335 may extend from the front of the doorbell 330 and at least partially wrap around the back plate 339, thereby allowing a coupled connection between the faceplate 335 and the back plate 339. The back plate 339 may have indentations in its structure to facilitate the coupling.

With further reference to FIG. 15, spring contacts 340 may provide power to the doorbell 330 when mated with other conductive contacts connected to a power source. The spring contacts 340 may comprise any suitable conductive material, including, without limitation, copper, and may be capable of deflecting when contacted by an inward force, for example the insertion of a mating element. The doorbell 330 further comprises a connector 360, such as a micro-USB or other connector, whereby power and/or data may be supplied to and from the components within the doorbell 330. A reset button 359 may be located on the back plate 339, and may make contact with a button actuator (not shown) located within the doorbell 330 when the reset button 359 is pressed. When the reset button 359 is pressed, it may trigger one or more functions, as described below.

FIG. 16 is a right side cross-sectional view of the doorbell 330 without the mounting bracket 337. In the illustrated embodiment, the lens 332 is substantially coplanar with the front surface 331F of the enclosure 331. In alternative embodiments, the lens 332 may be recessed within the enclosure 331 or may protrude outward from the enclosure 331. The camera 334 is coupled to a camera printed circuit board (PCB) 347, and a lens 334a of the camera 334 protrudes through an opening in the enclosure 331. The camera lens 334a may be a lens capable of focusing light into the camera 334 so that clear images may be taken.

The camera PCB 347 may be secured within the doorbell with any suitable fasteners, such as screws, or interference connections, adhesives, etc. The camera PCB 347 comprises various components that enable the functionality of the camera 334 of the doorbell 330, as described below. Infrared light-emitting components, such as infrared LED's 368, are coupled to the camera PCB 347 and may be triggered to activate when a light sensor detects a low level of ambient light. When activated, the infrared LED's 368 may emit infrared light through the enclosure 331 and/or the camera 334 out into the ambient environment. The camera 334, which may be configured to detect infrared light, may then capture the light emitted by the infrared LED's 368 as it reflects off objects within the camera's 334 field of view, so that the doorbell 330 can clearly capture images at night (may be referred to as "night vision").

With continued reference to FIG. 16, the doorbell 330 further comprises a front PCB 346, which in the illustrated embodiment resides in a lower portion of the doorbell 330 adjacent a battery 366. The front PCB 346 may be secured within the doorbell 330 with any suitable fasteners, such as screws, or interference connections, adhesives, etc. The front PCB 346 comprises various components that enable the functionality of the audio and light components, as further described below. The battery 366 may provide power to the doorbell 330 components while receiving power from the spring contacts 340, thereby engaging in a trickle-charge method of power consumption and supply. Alternatively, the doorbell 330 may draw power directly from the spring contacts 340 while relying on the battery 366 only when the spring contacts 340 are not providing the power necessary for all functions. Still further, the battery 366 may comprise the sole source of power for the doorbell 330. In such embodiments, the spring contacts 340 may not be connected to a source of power. When the battery 366 is depleted of its charge, it may be recharged, such as by connecting a power source to the connector 360.

With continued reference to FIG. 16, the doorbell 330 further comprises a power PCB 348, which in the illustrated embodiment resides behind the camera PCB 347. The power PCB 348 may be secured within the doorbell 330 with any suitable fasteners, such as screws, or interference connections, adhesives, etc. The power PCB 348 comprises various components that enable the functionality of the power and device-control components, as further described below.

With continued reference to FIG. 16, the doorbell 330 further comprises a communication module 364 coupled to the power PCB 348. The communication module 364 facilitates communication with client devices in one or more remote locations, as further described below. The connector 360 may protrude outward from the power PCB 348 and extend through a hole in the back plate 339. The doorbell 330 further comprises passive infrared (PIR) sensors 344, which are secured on or within a PIR sensor holder 343, and the assembly resides behind the lens 332. In some embodiments, the doorbell 330 may comprise three PIR sensors 344, as further described below, but in other embodiments any number of PIR sensors 344 may be provided. In some embodiments, one or more of the PIR sensors 344 may comprise a pyroelectric infrared sensor. The PIR sensor holder 343 may be secured to the doorbell 330 with any suitable fasteners, such as screws, or interference connections, adhesives, etc. The PIR sensors 344 may be any type of sensor capable of detecting and communicating the presence of a heat source within their field of view. Further, alternative embodiments may comprise one or more motion sensors either in place of or in addition to the PIR sensors 344. The motion sensors may be configured to detect motion using any methodology, such as a methodology that does not rely on detecting the presence of a heat source within a field of view.

FIG. 17 is an exploded view of the doorbell 330 and the mounting bracket 337 according to an aspect of the present embodiments. The mounting bracket 337 is configured to be mounted to a mounting surface (not shown) of a structure, such as a home or an office. FIG. 17 shows the front side 337F of the mounting bracket 337. The mounting bracket 337 is configured to be mounted to the mounting surface such that the back side 337B thereof faces the mounting surface. In certain embodiments, the mounting bracket 337 may be mounted to surfaces of various composition, including, without limitation, wood, concrete, stucco, brick, vinyl siding, aluminum siding, etc., with any suitable fasteners, such as screws, or interference connections, adhesives, etc. The doorbell 330 may be coupled to the mounting bracket 337 with any suitable fasteners, such as screws, or interference connections, adhesives, etc.

With continued reference to FIG. 17, the illustrated embodiment of the mounting bracket 337 includes the terminal screws 338. The terminal screws 338 are configured to receive electrical wires adjacent the mounting surface of the structure upon which the mounting bracket 337 is mounted, so that the doorbell 330 may receive electrical power from the structure's electrical system. The terminal screws 338 are electrically connected to electrical contacts 377 of the mounting bracket. If power is supplied to the terminal screws 338, then the electrical contacts 377 also receive power through the terminal screws 338. The electrical contacts 377 may comprise any suitable conductive material, including, without limitation, copper, and may protrude slightly from the face of the mounting bracket 337 so that they may mate with the spring contacts 340 located on the back plate 339.

Figure 18:
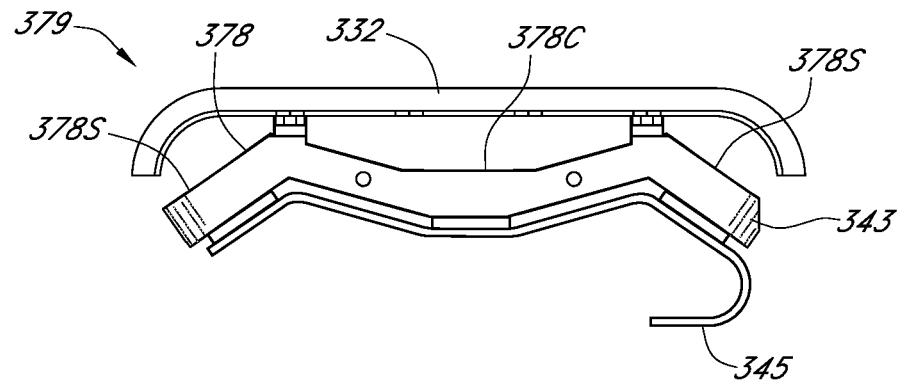
FIG. 18 is a top view of a passive infrared sensor assembly according to various aspects of the present disclosure.

With continued reference to FIG. 17, the mounting bracket 337 further comprises a bracket PCB 349. The bracket PCB 349 is situated outside the doorbell 330, and is therefore configured for various sensors that measure ambient conditions, such as an accelerometer 350, a barometer 351, a humidity sensor 352, and a temperature sensor 353 (FIG. 18). The functions of these components are discussed in more detail below. The bracket PCB 349 may be secured to the mounting bracket 337 with any suitable fasteners, such as screws, or interference connections, adhesives, etc.

With continued reference to FIG. 17, the faceplate 335 may extend from the bottom of the doorbell 330 up to just below the camera 334, and connect to the back plate 339 as described above. The lens 332 may extend and curl partially around the side of the doorbell 330. The enclosure 331 may extend and curl around the side and top of the doorbell 330, and may be coupled to the back plate 339 as described above. The camera 334 may protrude slightly through the enclosure 331, thereby giving it a wider field of view. The mounting bracket 337 may couple with the back plate 339 such that they contact each other at various points in a common plane of contact, thereby creating an assembly including the doorbell 330 and the mounting bracket 337. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 19:
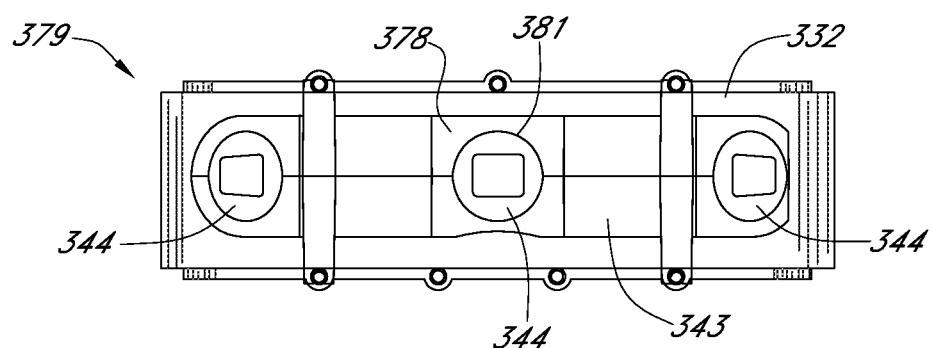
FIG. 19 is a front view of the passive infrared sensor assembly of FIG. 18.

FIG. 18 is a top view and FIG. 19 is a front view of a passive infrared sensor assembly 179 including the lens 132, the passive infrared sensor holder 143, the passive infrared sensors 144, and a flexible power circuit 145. The passive infrared sensor holder 143 is configured to mount the passive infrared sensors 144 facing out through the lens 132 at varying angles, thereby allowing the passive infrared sensor 144 field of view to be expanded to 180° or more and also broken up into various zones, as further described below. The passive infrared sensor holder 143 may include one or more faces 178, including a center face 178C and two side faces 178S to either side of the center face 178C. With reference to FIG. 19, each of the faces 178 defines an opening 181 within or on which the passive infrared sensors 144 may be mounted. In alternative embodiments, the faces 178 may not include openings 181, but may instead comprise solid flat faces upon which the passive infrared sensors 144 may be mounted. Generally, the faces 178 may be any physical structure capable of housing and/or securing the passive infrared sensors 144 in place.

With reference to FIG. 18, the passive infrared sensor holder 143 may be secured to the rear face of the lens 132. The flexible power circuit 145 may be any material or component capable of delivering power and/or data to and from the passive infrared sensors 144, and may be contoured to conform to the non-linear shape of the passive infrared sensor holder 143. The flexible power circuit 145 may connect to, draw power from, and/or transmit data to and from, the power printed circuit board 148.

Figure 20:
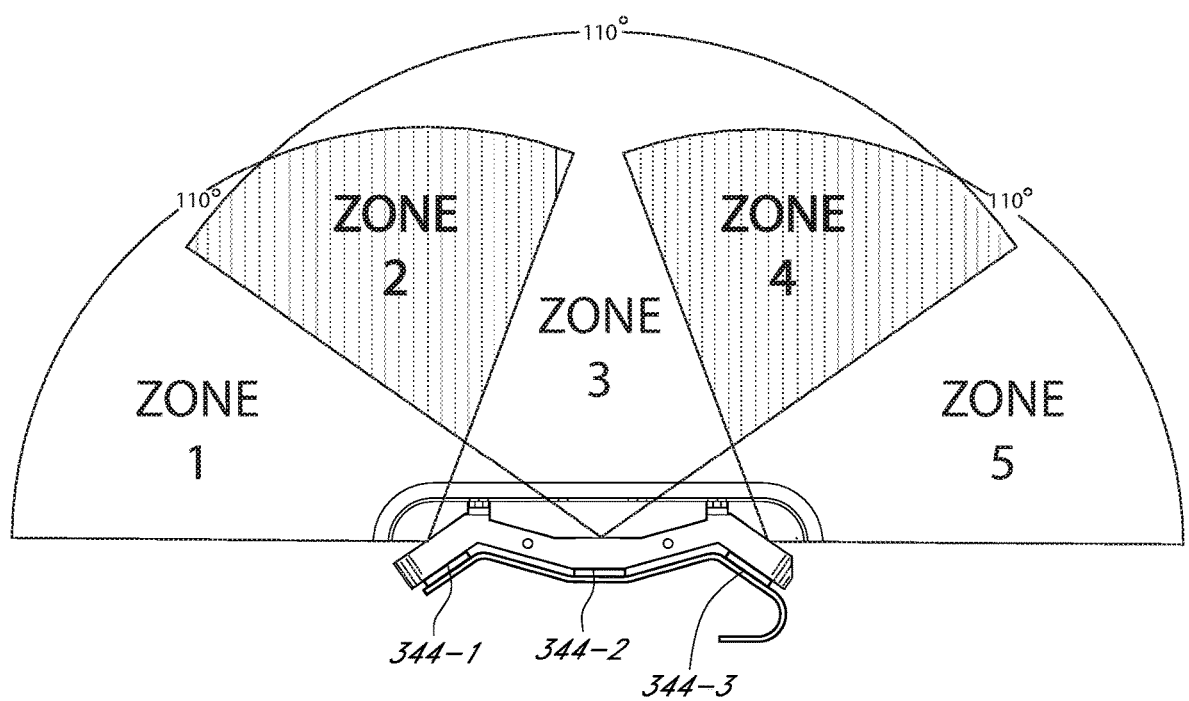
FIG. 20 is a top view of the passive infrared sensor assembly of FIG. 18, illustrating the fields of view of the passive infrared sensors according to various aspects of the present disclosure.

FIG. 20 is a top view of the passive infrared sensor assembly 179 illustrating the fields of view of the passive infrared sensors 144. In the illustrated embodiment, the side faces 178S of the passive infrared sensor holder 143 are angled at 55° facing outward from the center face 178C, and each passive infrared sensor 144 has a field of view of 110°. However, these angles may be increased or decreased as desired. Zone 1 is the area that is visible only to a first one of the passive infrared sensors 144-1. Zone 2 is the area that is visible only to the first passive infrared sensor 144-1 and a second one of the passive infrared sensors 144-2. Zone 3 is the area that is visible only to the second passive infrared sensor 144-2. Zone 4 is the area that is visible only to the second passive infrared sensor 144-2 and a third one of the passive infrared sensors 144-3. Zone 5 is the area that is visible only to the third passive infrared sensor 144-3. In some embodiments, the doorbell 130 may be capable of determining the direction that an object is moving based upon which zones are triggered in a time sequence.

Figure 21:
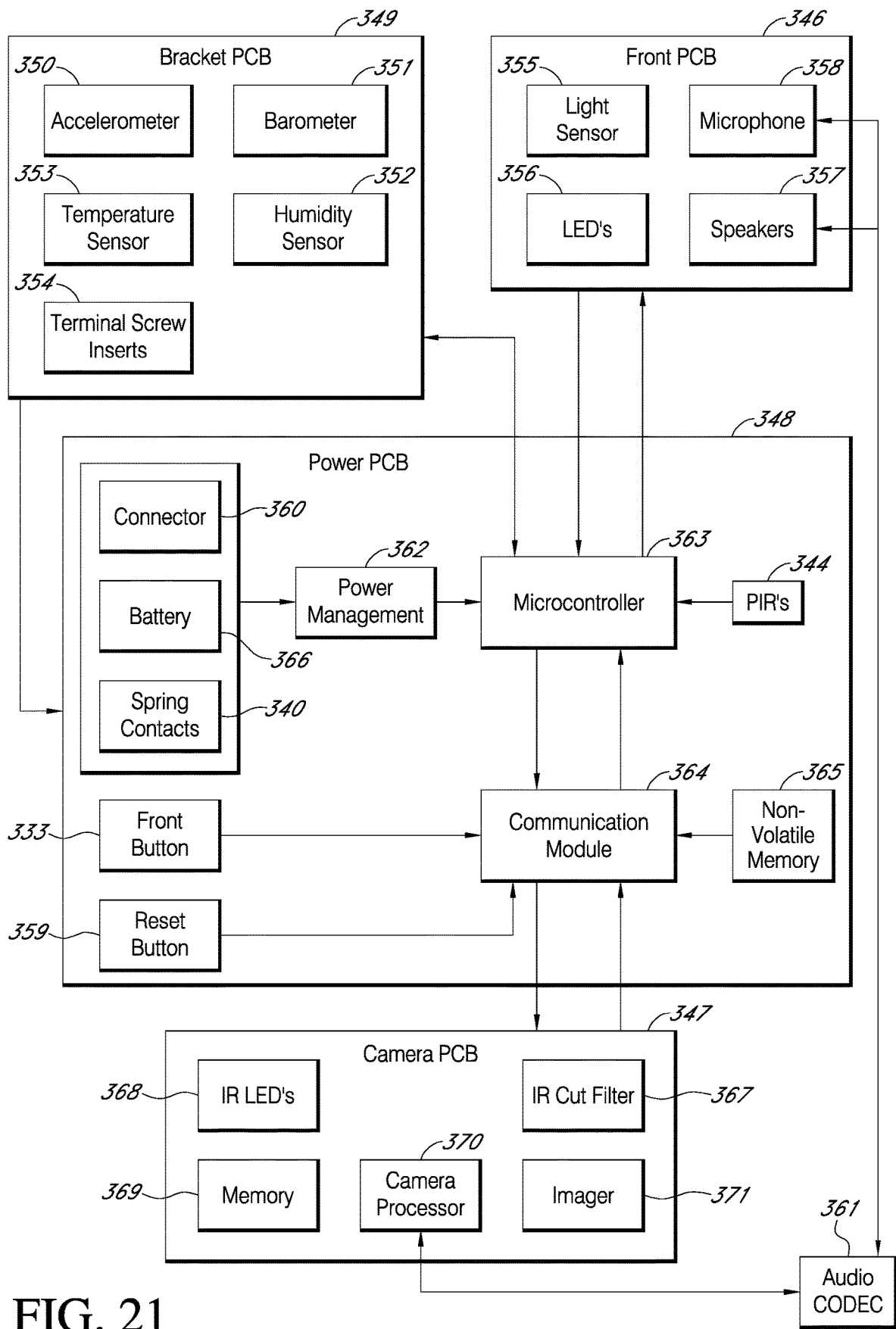
FIG. 21 is a functional block diagram of the components of the A/V recording and communication device of FIG. 14.

FIG. 21 is a functional block diagram of the components within or in communication with the doorbell 330, according to an aspect of the present embodiments. As described above, the bracket PCB 349 may comprise an accelerometer 350, a barometer 351, a humidity sensor 352, and a temperature sensor 353. The accelerometer 350 may be one or more sensors capable of sensing motion and/or acceleration. The barometer 351 may be one or more sensors capable of determining the atmospheric pressure of the surrounding environment in which the bracket PCB 349 may be located. The humidity sensor 352 may be one or more sensors capable of determining the amount of moisture present in the atmospheric environment in which the bracket PCB 349 may be located. The temperature sensor 353 may be one or more sensors capable of determining the temperature of the ambient environment in which the bracket PCB 349 may be located. As described above, the bracket PCB 349 may be located outside the housing of the doorbell 330 so as to reduce interference from heat, pressure, moisture, and/or other stimuli generated by the internal components of the doorbell 330.

With further reference to FIG. 21, the bracket PCB 349 may further comprise terminal screw inserts 354, which may be configured to receive the terminal screws 338 and transmit power to the electrical contacts 377 on the mounting bracket 337 (FIG. 17). The bracket PCB 349 may be electrically and/or mechanically coupled to the power PCB 348 through the terminal screws 338, the terminal screw inserts 354, the spring contacts 340, and the electrical contacts 377. The terminal screws 338 may receive electrical wires located at the surface to which the doorbell 330 is mounted, such as the wall of a building, so that the doorbell can receive electrical power from the building's electrical system. Upon the terminal screws 338 being secured within the terminal screw inserts 354, power may be transferred to the bracket PCB 349, and to all of the components associated therewith, including the electrical contacts 377. The electrical contacts 377 may transfer electrical power to the power PCB 348 by mating with the spring contacts 340.

With further reference to FIG. 21, the front PCB 346 may comprise a light sensor 355, one or more light-emitting components, such as LED's 356, one or more speakers 357, and a microphone 358. The light sensor 355 may be one or more sensors capable of detecting the level of ambient light of the surrounding environment in which the doorbell 330 may be located. LED's 356 may be one or more light-emitting diodes capable of producing visible light when supplied with power. The speakers 357 may be any electro-mechanical device capable of producing sound in response to an electrical signal input. The microphone 358 may be an acoustic-to-electric transducer or sensor capable of converting sound waves into an electrical signal. When activated, the LED's 356 may illuminate the light pipe 336 (FIG. 14). The front PCB 346 and all components thereof may be electrically coupled to the power PCB 348, thereby allowing data and/or power to be transferred to and from the power PCB 348 and the front PCB 346.

The speakers 357 and the microphone 358 may be coupled to the camera processor 370 through an audio CODEC 361. For example, the transfer of digital audio from the user's client device 114 and the speakers 357 and the microphone 358 may be compressed and decompressed using the audio CODEC 361, coupled to the camera processor 370. Once compressed by audio CODEC 361, digital audio data may be sent through the communication module 364 to the network 112, routed by one or more servers 118, and delivered to the user's client device 114. When the user speaks, after being transferred through the network 112, digital audio data is decompressed by audio CODEC 361 and emitted to the visitor via the speakers 357.

With further reference to FIG. 21, the power PCB 348 may comprise a power management module 362, a microcontroller 363 (may also be referred to as "processor," "CPU," or "controller"), the communication module 364, and power PCB non-volatile memory 365. In certain embodiments, the power management module 362 may comprise an integrated circuit capable of arbitrating between multiple voltage rails, thereby selecting the source of power for the doorbell 330. The battery 366, the spring contacts 340, and/or the connector 360 may each provide power to the power management module 362. The power management module 362 may have separate power rails dedicated to the battery 366, the spring contacts 340, and the connector 360. In one aspect of the present disclosure, the power management module 362 may continuously draw power from the battery 366 to power the doorbell 330, while at the same time routing power from the spring contacts 340 and/or the connector 360 to the battery 366, thereby allowing the battery 366 to maintain a substantially constant level of charge. Alternatively, the power management module 362 may continuously draw power from the spring contacts 340 and/or the connector 360 to power the doorbell 330, while only drawing from the battery 366 when the power from the spring contacts 340 and/or the connector 360 is low or insufficient. Still further, the battery 366 may comprise the sole source of power for the doorbell 330. In such embodiments, the spring contacts 340 may not be connected to a source of power. When the battery 366 is depleted of its charge, it may be recharged, such as by connecting a power source to the connector 360. The power management module 362 may also serve as a conduit for data between the connector 360 and the microcontroller 363.

With further reference to FIG. 21, in certain embodiments the microcontroller 363 may comprise an integrated circuit including a processor core, memory, and programmable input/output peripherals. The microcontroller 363 may receive input signals, such as data and/or power, from the PIR sensors 344, the bracket PCB 349, the power management module 362, the light sensor 355, the microphone 358, and/or the communication module 364, and may perform various functions as further described below. When the microcontroller 363 is triggered by the PIR sensors 344, the microcontroller 363 may be triggered to perform one or more functions. When the light sensor 355 detects a low level of ambient light, the light sensor 355 may trigger the microcontroller 363 to enable "night vision," as further described below. The microcontroller 363 may also act as a conduit for data communicated between various components and the communication module 364.

With further reference to FIG. 21, the communication module 364 may comprise an integrated circuit including a processor core, memory, and programmable input/output peripherals. The communication module 364 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 364 may receive inputs, such as power and/or data, from the camera PCB 347, the microcontroller 363, the button 333, the reset button 359, and/or the power PCB non-volatile memory 365. When the button 333 is pressed, the communication module 364 may be triggered to perform one or more functions. When the reset button 359 is pressed, the communication module 364 may be triggered to erase any data stored at the power PCB non-volatile memory 365 and/or at the camera PCB memory 369. The communication module 364 may also act as a conduit for data communicated between various components and the microcontroller 363. The power PCB non-volatile memory 365 may comprise flash memory configured to store and/or transmit data. For example, in certain embodiments the power PCB non-volatile memory 365 may comprise serial peripheral interface (SPI) flash memory.

With further reference to FIG. 21, the camera PCB 347 may comprise components that facilitate the operation of the camera 334. For example, an imager 371 may comprise a video recording sensor and/or a camera chip. In one aspect of the present disclosure, the imager 371 may comprise a complementary metal-oxide semiconductor (CMOS) array, and may be capable of recording high definition (e.g., 1080p or better) video files. A camera processor 370 may comprise an encoding and compression chip. In some embodiments, the camera processor 370 may comprise a bridge processor. The camera processor 370 may process video recorded by the imager 371 and audio recorded by the microphone 358, and may transform this data into a form suitable for wireless transfer by the communication module 364 to a network. The camera PCB memory 369 may comprise volatile memory that may be used when data is being buffered or encoded by the camera processor 370. For example, in certain embodiments the camera PCB memory 369 may comprise synchronous dynamic random-access memory (SD RAM). IR LED's 368 may comprise light-emitting diodes capable of radiating infrared light. IR cut filter 367 may comprise a system that, when triggered, configures the imager 371 to see primarily infrared light as opposed to visible light. When the light sensor 355 detects a low level of ambient light (which may comprise a level that impedes the performance of the imager 371 in the visible spectrum), the IR LED's 368 may shine infrared light through the doorbell 330 enclosure out to the environment, and the IR cut filter 367 may enable the imager 371 to see this infrared light as it is reflected or refracted off of objects within the field of view of the doorbell. This process may provide the doorbell 330 with the "night vision" function mentioned above.

One aspect of the present embodiments includes the realization that audio/video (A/V) recording and communication devices (e.g., video doorbells) other than the present embodiments may not use captured image data as effectively as desired when generating user alert notifications. The effectiveness of user alert notifications is important because users of client devices associated with the A/V recording and communication devices may receive numerous user alert notifications on any given day, and some of these notifications may be more important and/or urgent than others. Thus, without informative notifications, important and/or urgent user alerts may be overlooked. In some examples, textual data may be used in lieu of the image data when generating user alert notifications. However, textual data may be repetitive and similar from alert to alert and thus may not offer enough unique information about the user alert to attract the user's attention. In other examples, A/V recording and communication devices other than the present embodiments may not leverage the image data as effectively as desired to provide more informative and helpful notifications of user alerts. For example, notifications of user alerts may include the first frame from the image data, which may not always include meaningful information, and similar to textual data, may not offer enough unique information about the user alert to attract the user's attention.

The present embodiments solve this problem by leveraging the functionality of A/V recording and communication devices, such as A/V recording and communication doorbells, to provide user alert notifications that include the image data in a more easily digestible and informative format. For example, the image data may be analyzed to determine a frame from the image data that is most relevant to the cause of the user alert (e.g., a frame including a facial image of a person who caused the user alert), and the frame may be included in the user alert notification. By leveraging the image data to provide more informative user alert notifications, users (e.g., homeowners) of the client devices associated with the A/V recording and communication devices may be more likely to not overlook the user alerts, but rather to view and interact with the user alerts. As a result, the users are more likely to identify suspicious activity around their homes and, in response, take appropriate actions, such as to alert law enforcement, sound an alarm, and/or notify neighbors, for example. Ultimately, because the users may be more likely to take appropriate action in response to more informative and effective user alert notifications, homes, neighborhoods, towns, and cities alike may benefit from enhanced public safety.

For example, some of the present embodiments receive image data captured by a camera in a field of view of the camera and analyze the image data, based on the analyzing, determine that the image data includes at least one frame including a facial image of a person, and, in response to the determination, generate and transmit, to a client device associated with an A/V recording and communication device, a user alert including the determined at least one frame.

Some of the present embodiments may comprise computer vision for one or more aspects, such as object and/or facial recognition. Computer vision includes methods for acquiring, processing, analyzing, and understanding images and, in general, high-dimensional data from the real world in order to produce numerical or symbolic information, e.g. in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g. ASCII). 2D Code Reading—Reading of 2D codes such as data matrix and QR codes. Facial Recognition. Shape Recognition Technology (SRT)—Differentiating human beings (e.g. head and shoulder patterns) from objects.

Typical functions and components (e.g. hardware) found in many computer vision systems are described in the following paragraphs. The present embodiments may include at least some of these aspects. For example, with reference to FIG. 3, embodiments of the present A/V recording and communication doorbell 130 may include a computer vision module 163. The computer vision module 163 may include any of the components (e.g. hardware) and/or functionality described herein with respect to computer vision, including, without limitation, one or more cameras, sensors, and/or processors. In some of the present embodiments, the microphone 150, the camera 154, and/or the imaging processor 240 may be components of the computer vision module 163.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the computer vision module 163). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, the computer vision module 163, and/or the camera 154 and/or the processor 160 may receive information about the person using any one, or any combination of more than one, of the foregoing biometrics.

Figure 22:
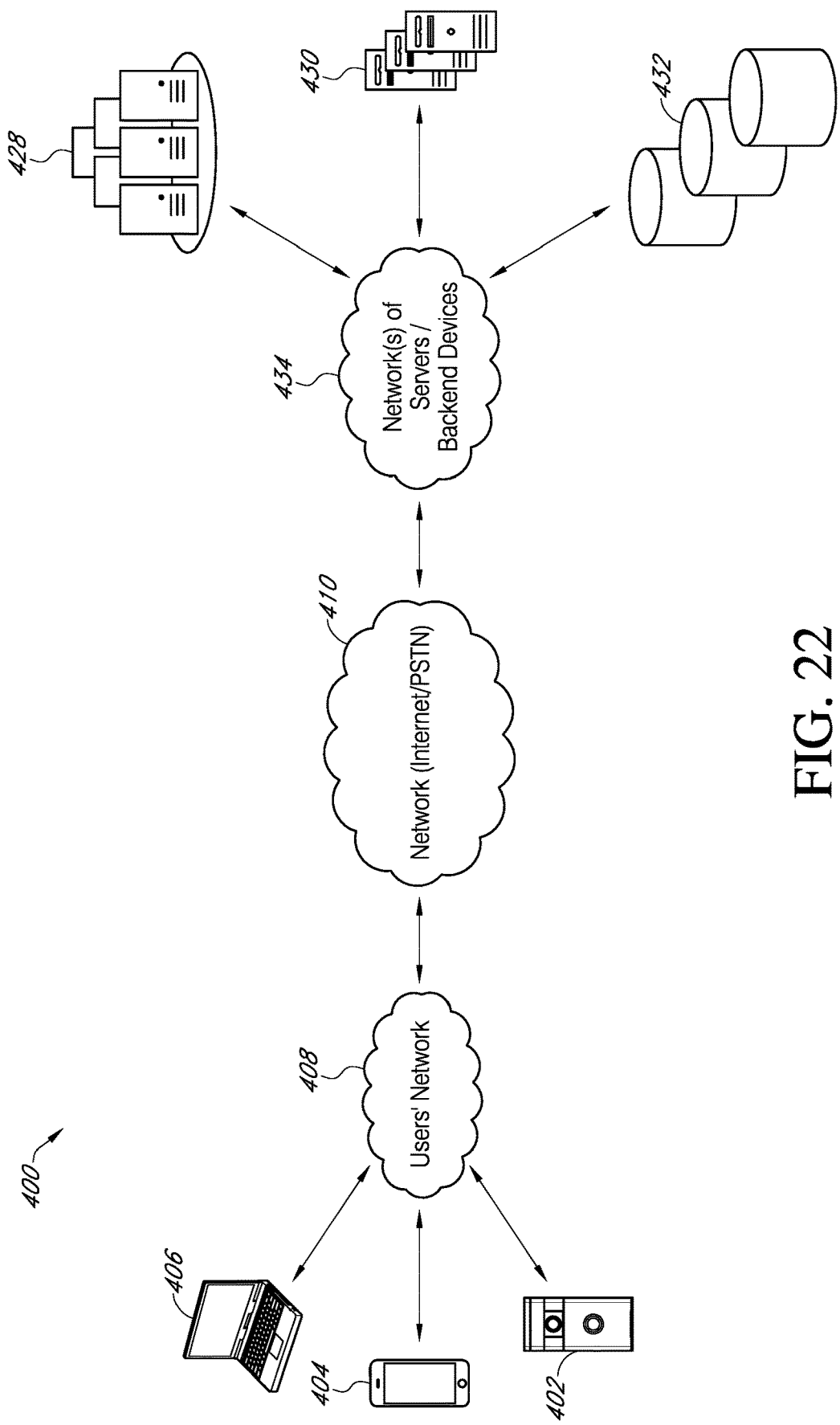
FIG. 22 is a is a functional block diagram illustrating a system for communicating in a network according to various aspects of the present disclosure.

FIG. 22 is a functional block diagram illustrating a system 400 for communicating in a network according to various aspects of the present disclosure. The system 400 may include one or more audio/video (A/V) recording and communication devices 402 configured to access a user's network 408 to connect to a network (Internet/PSTN) 410. The one or more A/V recording and communication devices 402 may include any or all of the components and/or functionality of the A/V recording and communication device 100 (FIGS. 1-2), the A/V recording and communication doorbell 130 (FIGS. 3-13), and/or the A/V recording and communication doorbell 330 (FIGS. 14-21). As discussed herein, the present disclosure provides numerous examples of methods and systems including A/V recording and communication devices 402, such as A/V recording and communication doorbells, but the present embodiments are equally applicable for A/V recording and communication devices 402 other than doorbells. For example, the present embodiments may include one or more A/V recording and communication (indoor and/or outdoor) security cameras and/or A/V recording and communication security floodlights instead of, or in addition to, one or more A/V recording and communication doorbells. An example A/V recording and communication security camera may include substantially all of the structure and functionality of the doorbell 130, but without the front button 148, the button actuator 228, and/or the light pipe 232.

The user's network 408 may include any or all of the components and/or functionality of the user's network 110 described herein. The system 400 may also include one or more client devices 404, 406, which in various embodiments may be configured to be in network communication and/or associated with the A/V recording and communication device 402. The client devices 404, 406 may comprise, for example, a mobile phone such as a smartphone, or a computing device such as a tablet computer, a laptop computer, a desktop computer, etc. The client devices 404, 406 may include any or all of the components and/or functionality of the client device 114 and/or the client device 800 described herein. In some of the present embodiments, the client devices 404, 406 may not be associated with the A/V recording and communication device 402. In other words, the user/owner of the client device(s) 404, 406 may not also use/own a A/V recording and communication device 402.

With further reference to FIG. 22, the system 400 may also include various backend devices such as (but not limited to) storage devices 432, backend servers 430, and backend APIs 428 that may be in network communication with the A/V recording and communication device 402 and/or client device 404, 406. In some of the present embodiments, the storage devices 432 may be a separate device from the backend servers 430 (as illustrated) or may be an integral component of the backend servers 430. The storage devices 432 may be similar in structure and/or function to the storage device 116 (FIG. 1). In addition, in some of the present embodiments, the backend servers 430 and backend APIs 428 may be similar in structure and/or function to the server 118 and the backend API 120 (FIG. 1), respectively.

Figure 23:
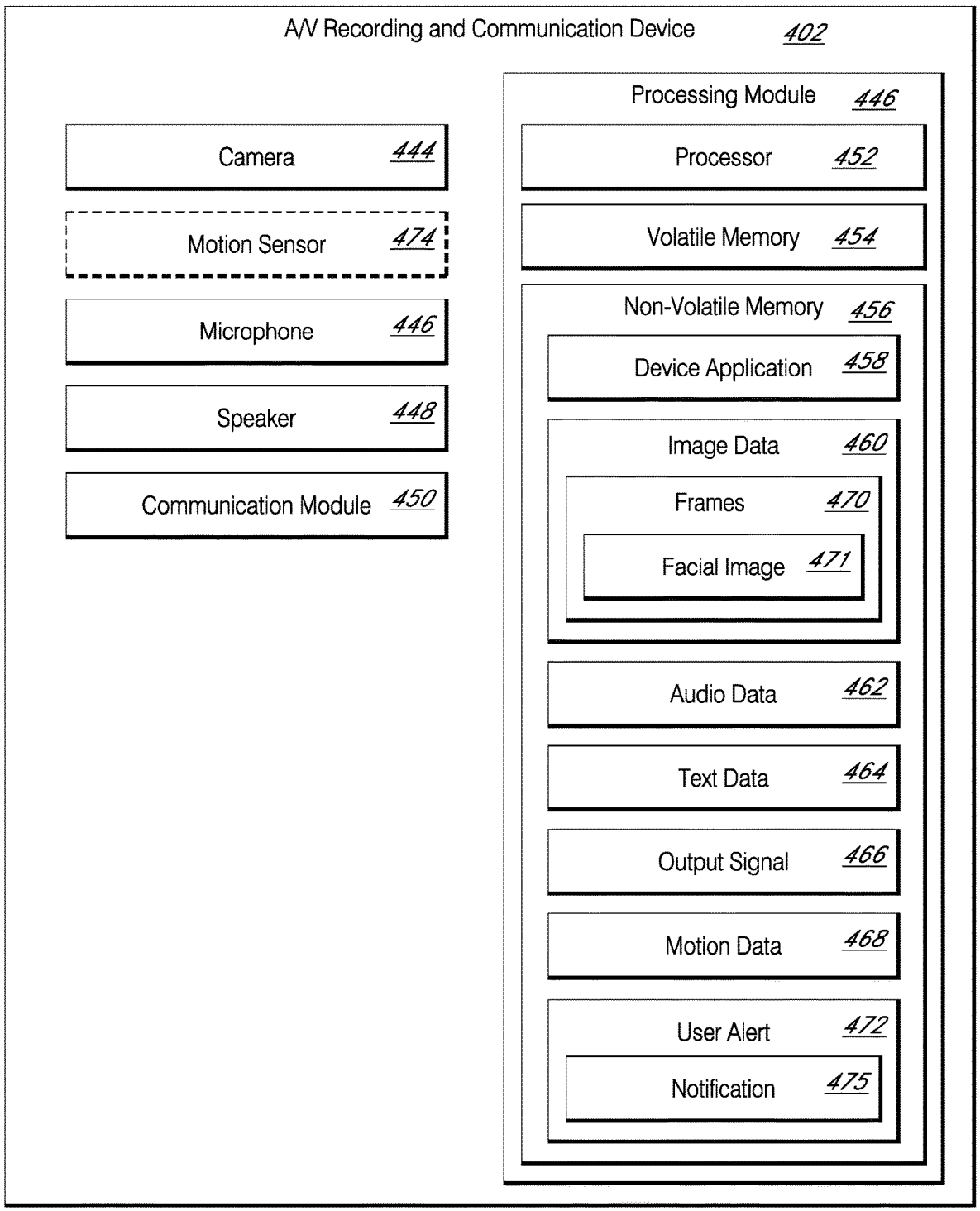
FIG. 23 is a functional block diagram illustrating one embodiment of an A/V recording and communication device according to various aspects of the present disclosure.

FIG. 23 is a functional block diagram illustrating an embodiment of the A/V recording and communication device 402 according to various aspects of the present disclosure. The A/V recording and communication device 402 may comprise a processing module 446 that is operatively connected to a camera 444, a microphone 446, a speaker 448, a motion sensor 474, and a communication module 450. The processing module 446 may comprise a processor 452, volatile memory 454, and non-volatile memory 456 that includes a device application 458. In various embodiments, the device application 458 may configure the processor 452 to capture image data 460 using the camera 444, audio data 462 using the microphone 446, and/or motion data 468 using at least one of the camera 444 and the motion sensor 474. In some of the present embodiments, the device application 458 may also configure the processor 452 to generate text data 464 describing the image data 460, such as in the form of metadata, for example. In some of the present embodiments, the text data 464 may include information about motion events, such as the cause of a motion event (e.g., a person, object, etc.). In embodiments where the A/V recording and communication device 402 may be in a smart-home environment, the text data 464 may further include information about the status (e.g., door open/close status for a door sensor) and/or change in status (e.g., "door opened 3 seconds ago" for a door sensor) based on data from one or more sensors in the smart-home environment (e.g., window and door sensors, thermostats, lighting sensors, smoke detectors, and the like.) In other embodiments, the text data 464 describing the image data 460 may be generated by a user using the client device 404, 406 associated with the A/V recording and communication device 402. In addition, the device application 458 may configure the processor 452 to transmit the image data 460, the audio data 462, the motion data 468, and/or the text data 464 to the client device 404, 406 using the communication module 450. In various embodiments, the device application 458 may also configure the processor 452 to generate and transmit an output signal 466 that may include the image data 460, the audio data 462, the text data 464, and/or the motion data 468. In some of the present embodiments, the output signal 466 may be transmitted to a backend device(s), such as the backend server(s) 430, using the communication module 450, and the backend device(s) may transfer the output signal 466 (or forward information in the output signal 466) to the client device 404, 406. In other embodiments, the output signal 466 may be transmitted directly to the client device 404, 406.

In further reference to FIG. 23, the image data 460 may comprise image sensor data such as (but not limited to) exposure values and data regarding pixel values for a particular sized grid. Further, the image data 460 may comprise converted image sensor data for standard image file formats such as (but not limited to) JPEG, JPEG 2000, TIFF, BMP, or PNG. In addition, the image data 460 may also comprise data related to video, where such data may include (but is not limited to) image sequences, frame rates, and the like. Moreover, the image data 460 may include data that is analog, digital, compressed, uncompressed, and/or in vector formats.

In some of the present embodiments, the image data 460 may also include facial recognition, facial detection, biometric recognition, object recognition, object detection, AIDC, and/or other information about the persons and/or objects in the image data 460, which may be generated using one or more of the methods described above. The facial recognition, facial detection, biometric recognition, object recognition, object detection, AIDC, and/or other information may be generated in response to using facial recognition software, facial detection software, object recognition, object detection, and/or biometric analysis software, for example, as described above. The facial recognition, facial detection, biometric recognition, object recognition, object detection, AIDC, and/or other information may be included in the image data 460 for analysis in some of the present embodiments.

In some of the present embodiments, in response to using the computer vision software (e.g., facial recognition and/or facial detection), it may be determined that at least one of the frames 470 of the image data 460 includes at least one facial image 471. The image data 460 may, for example, include multiple frames 470 that include a facial image 471, such as where a person is within the field of view of the camera 444 for a period of time. As such, the facial images 471 captured by the camera and identified by the computer vision software may include different facial images 471, such as right- and/or left-side profile facial images 471, face-on facial images 471, top-down facial images 471, bottom-up facial images 471, and the like.

In addition, the frames 470 may include different quality facial images 471. For example, some of the facial images 471 may be clearer (e.g., higher image quality) than other facial images 471, which may be dependent on the movement of the person within the field of view of the camera 444 (e.g., the image quality may be lower if the person is moving quickly and/or abruptly) and/or the location of the person in the field of view of the camera 444 (e.g., the closer the person is to the camera 444, the higher quality the facial image 471 may be). In some of the present embodiments, the quality of the facial images 471 may also be dependent on the camera 444. For example, in some of the present embodiments, there may be multiple A/V recording and communication devices 402 each having their own camera 444, or multiple cameras 444 in a single A/V recording and communication device, and different cameras 444 may capture different quality image data 460 dependent on one or more factors, such as the camera's 444 specifications (e.g., 720p, 1080p, etc.), the distance between the person and the camera 444, and/or the viewing angle of the camera 444 with respect to the person. As a result, the quality of the facial images 471 captured by one camera 444 may be different than the quality of the facial images 471 captured by another camera 444, for example.

As discussed in more detail below, the processor 452 (or the processor 502 of the backend server 430), when generating the user alert 472, may include the at least one frame 470 including the facial image 471 in the notification 475 of the user alert 472. Because the image data 460 may include more than one frame 470 that includes a facial image 471 of a person, determining a higher quality facial image 471 to include in the notification 475 may be important to ensuring the notification 475 of the user alert 472 is informative and indicative of the image data 460 (e.g., the motion event that caused the camera 444 to capture the image data 460) included in the user alert 472. As such, the processes described herein may analyze the image data 460 to determine the frame(s) 470 that include(s) the highest quality facial image(s) 471. This analysis may take into account the quality of the facial images 471 based on facial recognition and/or facial detection software (e.g., the portion of the face in the facial images 471), the location and/or movement (e.g., direction and/or speed) of the person within the field of view of the camera 444, the specifications of the camera (s) 444, and/or other information pertaining to the quality of the facial images 471 (and corresponding frames 470).

The image data 460 may take on various forms and formats as appropriate to the requirements of a specific application in accordance with the present embodiments. As described herein, the term "record" may also be referred to as "capture" as appropriate to the requirements of a specific application in accordance with the present embodiments.

In further reference to FIG. 23, the motion data 468 may comprise data generated by the motion sensor 474 and/or the camera 444. In embodiments that use the motion sensor 474, such as PIR-type motion sensors, the motion data 468 may include voltage data generated by the motion sensor 474 in response to the presence of infrared radiation. In some of the present embodiments, the motion data 468 may also comprise time-based and/or location-based information such as the amount of time a motion event is detected and/or the location of the motion event in the field of view of the motion sensor 474 and/or the field of view of the camera 444 (e.g., Zones 1-5 (FIG. 20), the location within one of the Zones 1-5, and/or the proximity to the A/V recording and communication device 402). Dependent on the type of motion sensor 474 implemented in a given embodiment, the motion data 468 may include the data type (e.g., voltage) generated specific to the type of motion sensor 474 (e.g., PIR, microwave, acoustic, etc.). The motion sensor 474 of FIG. 23 is illustrated with dashed lines to indicate that the motion sensor 474 may not be a feature of the A/V recording and communication device 402 and/or may not be used in certain embodiments (e.g., the A/V recording and communication doorbell 130 of FIG. 3-13).

In embodiments where the A/V recording and communication device 402 is similar to that of the A/V recording and communication doorbell 130 of FIGS. 3-13, the motion data 468 may be generated solely by the camera 444. As such, the detection of a motion event, the determination of whether a motion event is caused by the movement of a person and/or object in a field of view of the A/V recording and communication device 402, and/or the speed and/or location of a person and/or object in the field of view of the A/V recording and communication device 402 may be determined using the motion data 468 generated by the camera 444, for example.

The motion data 468 may further include an estimated speed and/or direction data of the person and/or object that caused the motion event. For example, the motion data 468 may include an estimated speed of a person and/or object passing in a field of view of the motion sensor 474 and/or the camera 444. For another example, the motion data 468 may include a direction that a person and/or object in front of the motion sensor 474 and/or camera 444 is traveling, such as toward or away from the A/V recording and communication device 402.

In some of the present embodiments, the motion data 468 may be used alone or in combination with the image data 460 to determine the frames 470 that may include the presence of a person. For example, the location of the person in the field of view of the A/V recording and communication device 402, the movement and/or direction of the person in the field of view of the A/V recording and communication device 402, and the presence of the person in the field of view of the A/V recording and communication device 402 may be determined, based at least on part, on one or both of the image data 460 and the motion data 468. In some of the present embodiments, the motion data 468 may be included in the image data 460 for analysis (e.g., at block B602 of FIG. 25 and block B610 of FIG. 26, described below).

Figure 24:
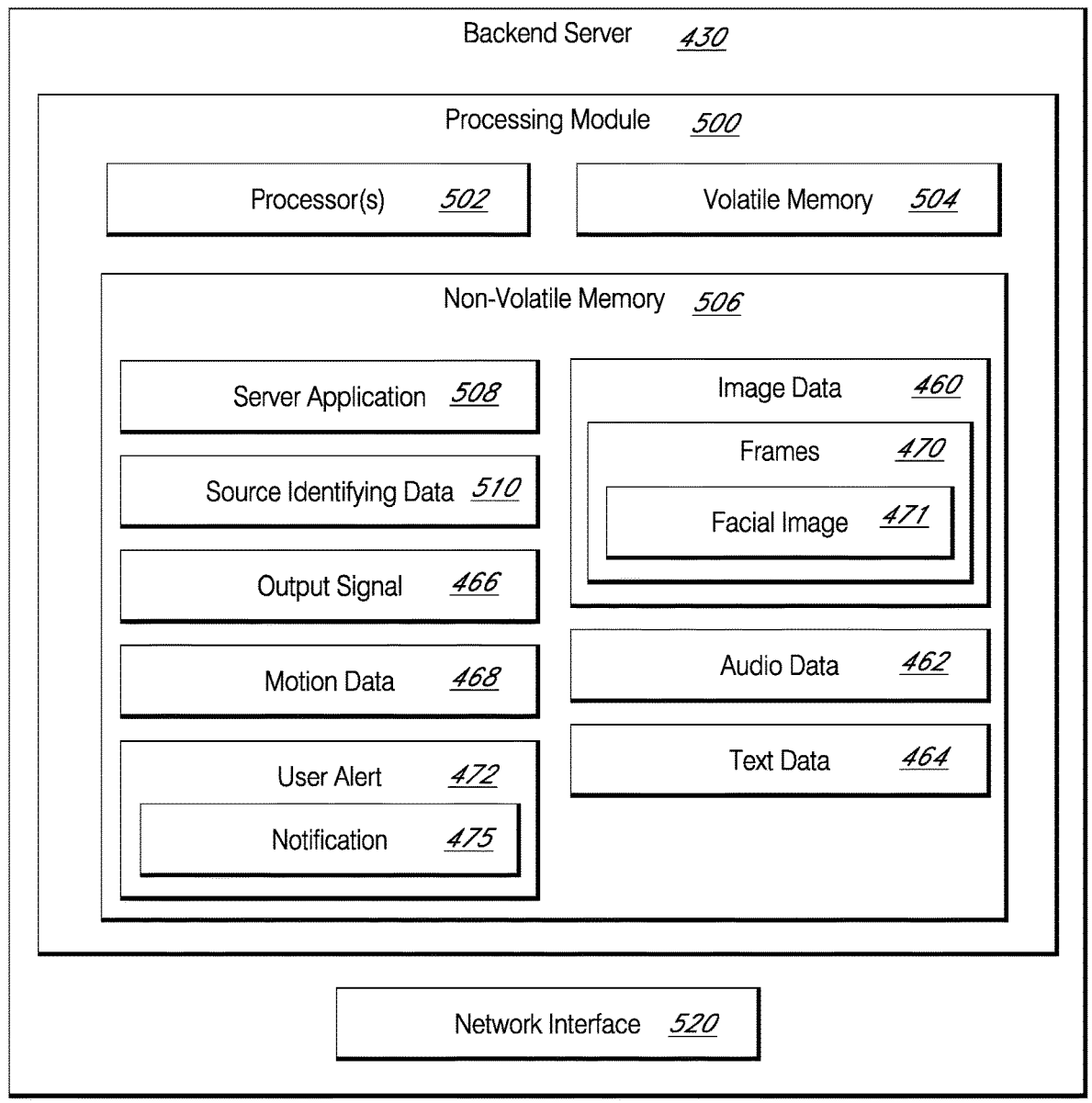
FIG. 24 is a functional block diagram illustrating one embodiment of a backend device according to various aspects of the present disclosure.

FIG. 24 is a functional block diagram illustrating one embodiment of the backend server(s) 430 according to various aspects of the present disclosure. The backend server(s) 430 may comprise a processing module 500 comprising a processor 502, volatile memory 504, and non-volatile memory 506. The backend server(s) 430 may further comprise a network interface 520, which may allow the backend server(s) 430 to access and communicate with devices connected to the network (Internet/PSTN) 410. The non-volatile memory 506 may include a server application 508 that configures the processor 502 to receive the image data 460, the audio data 462, the text data 464, and/or the motion data 468 from the A/V recording and communication device 402 in the output signal 466, for example. In various embodiments, and as described below, the backend server(s) 430 may be configured to receive the image data 460 captured by the camera 444 in a field of view of the camera 444 and analyze the image data 460, based on the analyzing, determine that the image data 460 includes at least one frame 470 including the facial image 471 of a person, and in response to the determination, generate and transmit, to the client device 404, 406 associated with the A/V recording and communication device 402, a user alert 472 including the determined at least one frame 470.

In further reference to FIG. 24, the non-volatile memory 506 may also include source identifying data 510 that may be used to identify the A/V recording and communication device 402 that transmitted the image data 460, the audio data 462, the text data 464, and/or the motion data 468 to the backend server(s) 430. In some of the present embodiments, identifying the A/V recording and communication device 402 may include determining the location of the device 402, which location may be used to determine which client devices 404, 406 will receive the user alert 472 (including the notification 475) and the image data 460. In addition, the source identifying data 510 may be used to determine the location(s) of the client device(s) 404, 406. In some of the present embodiments, the server application 508 may further configure the processor 502 to generate and transmit a report signal (not shown) to a third-party client device (not shown), which may be associated with a law enforcement agency, for example. The report signal sent to the law enforcement agency may include information indicating an approximate location of where the image data 460 was captured, which may assist the law enforcement agency with apprehending the criminal perpetrator shown in the image data 460.

In the illustrated embodiment of FIGS. 23-24, the various components including (but not limited to) the processing modules 446, 500, the communication module 450, and the network interface 520 are represented by separate boxes. The graphical representations depicted in each of FIGS. 23-24 are, however, merely examples, and are not intended to indicate that any of the various components of the A/V recording and communication device 402 or the backend server(s) 430 are necessarily physically separate from one another, although in some of the present embodiments they might be. In other embodiments, however, the structure and/or functionality of any or all of the components of A/V recording and communication device 402 may be combined. In addition, in some of the present embodiments the communication module 450 may include its own processor, volatile memory, and/or non-volatile memory. Further, the structure and/or functionality of any or all of the components of the backend server(s) 430 may be combined. In addition, in some of the present embodiments the network interface 520 may include its own processor, volatile memory, and/or non-volatile memory.

Figure 25:
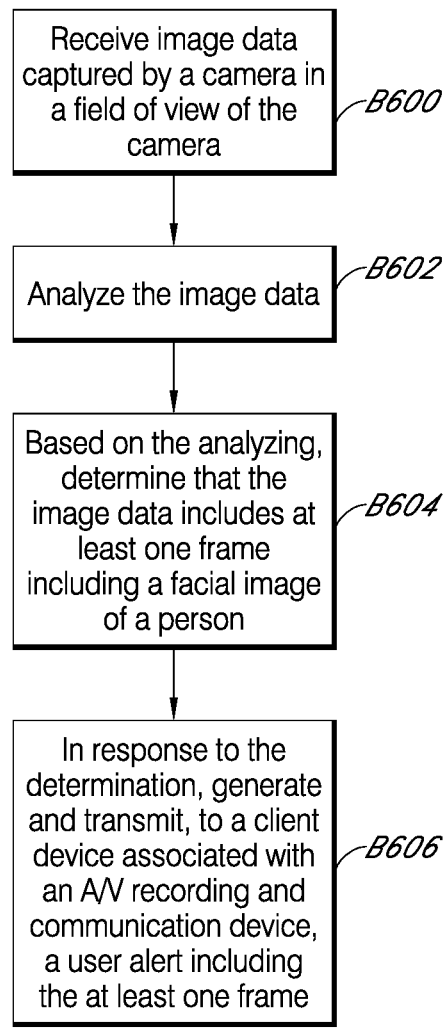
FIGS. 25-26 are flowcharts illustrating processes for selecting a video frame for notification using A/V recording and communication devices according to various aspects of the present disclosure.

Now referring to FIG. 25, FIG. 25 is a flowchart illustrating one embodiment of a process for selecting a video frame for notification using A/V recording and communication devices according to various aspects of the present disclosure. At block B600, the process receives image data captured by a camera in a field of view of the camera. For example, the processor 452 (or the processor 502) may receive the image data 460 captured by the camera 444 in a field of view of the camera 444. In some of the present embodiments, the image data 460 may be received over the user's network 408 and/or the network (Internet/PSTN) 410. The image data 460 may be generated by the camera 444 of the A/V recording and communication device 402 in response to a motion event detected by the camera 444 in a field of view of the camera 444 and/or the motion sensor 474 in a field of view of the motion sensor 474, and transmitted over the user's network 408 and/or the network (Internet/PSTN) 410.

At block B602, the process analyzes the image data. For example, the processor 452 (or the processor 502) may analyze the image data 460. In some of the present embodiments, the image data 460 may be analyzed using computer vision software (e.g., facial recognition and/or facial detection software). For example, facial detection software may be used to determine if a person is present in the image data 460 (e.g., if there is a facial image 471 in any of the frames 470 of the image data 460). In addition, the facial detection software may be used to determine, for each frame 470 that includes a facial image 471, the portion of the face that is present in the facial image 471. In addition to, or separate from, the facial detection software, facial recognition software may be used to determine if the person in the facial images 471 is recognizable. This may be done by, for example, comparing the facial features and characteristics of the person to a database of suspicious persons, such as a most wanted database, for example. In another example, the facial recognition software may be used to determine if the person is an authorized person, such as by comparing the facial features and characteristics of the person to a database of authorized persons. Other methods, such as those described above, including biometric analysis, for example, may be used to analyze the image data 460 without departing from the scope of the present disclosure.

In some of the present embodiments, the image data 460 may be analyzed to determine a location of the person in the field of view of the camera 444. For example, the image data 460 may be analyzed to determine a distance of the person from the A/V recording and communication device 402. As another example, the image data 460 may be analyzed to determine where in the field of view of the camera 444 the person is, such as to the side or in front of the camera 444. More specifically, the image data 460 may be analyzed to determine the physical location in an environment, such as a home environment, where the person is. For example, with reference to FIG. 28, it may be determined that the person is in the yard, on the front walkway 713, on the street 712, and/or on the front porch 711.

In some of the present embodiments, the image data 460 may be analyzed to determine the movement of the person, such as their speed and/or direction within the field of view of the camera 444. In such embodiments, the motion data 468 may also be analyzed in addition to the image data 460 to determine the speed and/or direction of the person in the field of view of the camera 444 and/or the motion sensor 474.

Any of the following, either singly or in any combination, may be used to determine not only that at least one frame 470 includes a facial image 471, but which of the frames 470 are the highest quality frames 470 (e.g., include the highest quality and/or most identifiable facial images 471): The analysis of the image data 460 to determine whether a person is present, the frames 470 that include the facial images 471, the quality of the facial images 471, the types of facial images 471, the location, speed, and/or direction of the person, and/or other determinations. As will be discussed in further detail below, the highest quality facial image(s) 471 may be included in the notification 475 of the user alert 472.

At block B604, the process, based on the analyzing, determines that the image data includes at least one frame including a facial image of a person. For example, based on the analyzing (at block B602), the processor 452 (or processor 502) may determine that the image data 460 includes at least one frame 470 including a facial image 471 of a person. As discussed above, the determination may be made based on the analysis of the image data 460 using the facial recognition, facial detection, biometric recognition, and/or other software.

In some of the present implementations, once it is determined that at least one frame 470 includes the facial image 471, the analysis may stop. For example, where the user alert 472 is sent in response to a current motion event, and the image data 460 is being transmitted live to the client device 404, 406, the notification 475 of the user alert 472 may include the first frame 470 having a facial image 471 of the person.

In some of the present embodiments, if the user does not interact with the notification 475 of the user alert 472 (e.g., by viewing the notification 475, selecting the notification 475 to open an application for viewing the user alert 472, opening an application for viewing the user alert 472 in response to viewing the user alert 472, etc.), the frame 470 included in the notification 475 of the user alert 472 may be updated to include another frame 470 including a higher quality and/or more relevant facial image 471 from the image data 460, for example. This process of updating the frame 470 may be performed continually until the user interacts with the notification 475 of the user alert 472. For example, each time a frame 470 having a higher quality and/or more relevant (e.g., identifiable) facial image 471 is captured by the camera 444, the notification 475 of the user alert 472 may be updated to include the higher quality frame 470. In some of the present embodiments, the process of updating the frame 470 may be performed at predetermined intervals, such as every second, every 5 seconds, every 10 seconds, every 30 seconds, or every minute, for example. As such, at the predetermined interval, the processor 452 (or processor 502) may analyze the image data 460 to compare each of the frames 470 including facial images 471 to make a determination of the highest quality and/or most relevant facial image 471 and transmit an updated notification 475 of the user alert 472 including the higher quality facial image 471. By performing this process of updating the frame 470, the user may be more likely to interact with the notification 475 of the user alert 472. For example, the user may originally not interact with the user alert 472 based on the facial image 471 in the frame 470 originally displayed on the display of the client device 404, 406, but based on the updated frame 470 including a higher quality facial image 471, the user may choose to interact with the notification 475 of the user alert 472.

In other embodiments, it may be determined that multiple frames 470 include the facial image 471 before the notification 475 of the user alert 472 is transmitted. As a result, the multiple frames 470 may be analyzed to make a determination not only that the multiple frames 470 include the facial images 471, but also to determine at least one frame 470 having the highest quality and/or most identifiable facial image 471. For example, this analysis may be similar to that discussed above with reference to block B602, particularly with reference to analyzing the frames 470 to determine the portion of the face of the person in the facial image 471, the quality of the image data 460 (e.g., where there are multiple cameras 444 and/or one camera operating at a lower resolution), the location and/or movement of the person in the field of view of the camera 444, and/or the identity of the person in the facial image 471.

In some of the present embodiments, there may be multiple people in the field of view of the camera 444. In such embodiments, facial recognition, facial detection, biometric software, and/or other methods including those described above may be used to determine the presence of the more than one person, to determine characteristics and features of the more than one person, and/or to determine the identity of the more than one person. These determination(s) may be used to determine which of the frames 470 including the facial images 471 to select for inclusion in the notification 475 of the user alert 472.

As discussed above, in some of the present embodiments, the selection of the frame 470 including a facial image 471 may be based on the determination that two or more persons are present in the image data 460. For example, once it is determined that two or more people are present, the frame 470 selected may be any frame 470 that includes facial images 471 of at least one of the people. In another example, the frame 470 selected may be any frame 470 that includes facial images 471 of both of the people 471. In yet another example, the frame 470 selected for inclusion in the notification 475 of the user alert 472 may be the frame 470 having the highest average quality between the facial images 471 of the two or more people and/or the highest quality of one of the facial images 471 of one of the people.

In some of the present embodiments, the selection of the frame 470 including the facial image 471 may be based on the determination of the characteristics and features of the more than one person. For example, it may be determined, based on computer vision or the like, that one of the two people in the image data 460 is a child (e.g., based on height), and the other is an adult. In such an example, the selection of the frame 470 may be based on this determination, such that the frame 470 selected is the frame 470 including the facial image 471 of the adult, for example. This may be because the users of the client devices 404, 406 may generally be more interested to know the appearance and/or identify of the adults on their property in the field of view of the camera 444, as opposed to children. Any facial image 471 of the adult, the highest quality facial image 471 of the adult, and/or the first facial image 471 of the adult may be selected in response to the determination that a child and an adult are present and included in the notification 475 of the user alert 472. In other embodiments, facial images 471 of the child may be selected over the adult, for example.

Many similar examples may be contemplated without departing from the scope of the present disclosure. For example, where a dog and a person are present in the image data 460, a frame 470 including a facial image 471 of the person may be selected with priority over a frame 470 include both the person and the dog.

In some of the present embodiments, the selection of the frame 470 including the facial image 471 may be based on the determination of the identity of the two or more people. For example, facial recognition and/or other computer vision software may be used to determine the identity of the two or more persons. If only one person can be identified, a frame 470 including a facial image 471 of the person who is identified may be selected for inclusion in the notification 475 of the user alert 472. In another example, a frame 470 including a facial image 471 of the person who is not identified may be selected for inclusion in the notification 475 of the user alert 472. In either example, the name of the identified person may be included in the notification 475 of the user alert 472 (e.g., as text data 464) along with the frame 470 including the facial image 471. If both people are identifiable, the notification 475 of the user alert 472 may include a frame 470 including a facial image 471 of only one of the people or a frame 471 including a facial image 471 of both the people. In another example, the highest average quality frame 470 including the facial images 471 of both of the people may be selected for inclusion in the notification 475 of the user alert 472. In either example, the names of the identified persons may be included as text data 464, for example, in the notification 475 of the user alert 472 along with the at least one frame 470.

At block B606, the process, in response to the determination, generates and transmits, to a client device associated with an A/V recording and communication device, a user alert including the at least one determined frame. For example, the processor 452 (or the processor 502), in response to the determination, generates and transmits, to the client device 404, 406, the user alert 472 including the at least one frame 470 including the facial image 471. In some of the present embodiments, the processor 452 of the A/V recording and communication device 402 may transmit the user alert 472 using the communication module 450. In other embodiments, the processor 502 of the backend server 430 may transmit the user alert 472 using the network interface 520.

The user alert 472 may be programmed to display on the display of the client device 404, 406 as a notification 475, such as a push-notification. The notification 475 may include the at least one frame 470 including the facial image 471. The notification 475 may be programmed such that when the user selects or otherwise interacts with the notification 475, the image data 460 including the frame 470 is displayed on the display of the client device 404, 406. For example, the frame 470 including the facial image 471 may be part of the image data 460 from a video recorded by the camera 444 in response to the presence of a person in the field of view of the A/V recording and communication device 402. As such, when the person interacts with the notification 475, the live and/or pre-recorded video is streamed to the display of the client device 404, 406. The user may choose to interact with the notification 475 in response to believing that, based on the facial image 471, the person is a suspicious person. However, without the facial image 471, the user may have ignored the notification 475 of the user alert 472 because without the facial image 471 the notification may not have been as informative or unique as the user desires.

The process of FIG. 25 may be implemented in a variety of embodiments, including those discussed below. However, the embodiments detailed below are not intended to be limiting, and are provided merely as example embodiments of the present disclosure. Other embodiments similar to those outlined herein may also fall within the scope of the present disclosure.

Figure 27:
FIG. 27 is a screenshot of a notification on a display of a client device illustrating an aspect of a process for selecting a video frame for notification using A/V recording and communication devices according to various aspects of the present disclosure.
Figure 28:
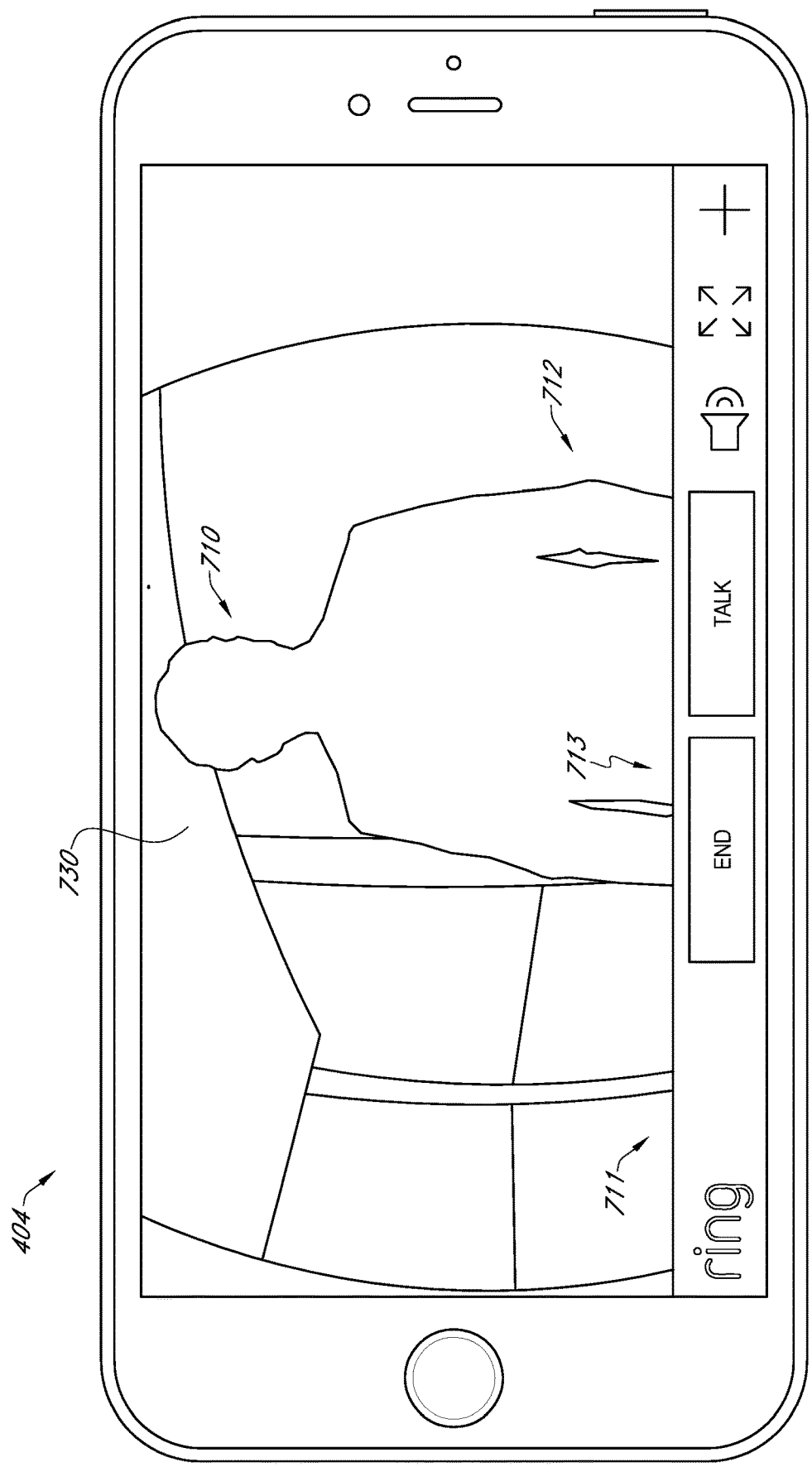
FIG. 28 is a screenshot of a graphical user interface (GUI) illustrating an aspect of a process for selecting a video frame for notification using A/V recording and communication devices according to various aspects of the present disclosure.

With reference to FIGS. 27-28, the process of FIG. 25, at block B600, may receive the image data 460 captured by the camera 444 in response to a person 710 entering the field of view of the camera 444. The person 710 may enter the field of view of the camera 444 near the street 712, for example, and walk up the front walkway 713 to the porch 711 in front of the front door, where the A/V recording and communication device 402 is located, for example, as illustrated in FIG. 28. As such, the image data 460 may include the person 710 for an extended period of time (e.g., over multiple frames 470 of the image data 460).

At block B602, the image data 460 may be analyzed to determine the presence of the person 710, the location of the person 710 in the field of view of the camera 444, the movement of the person 710, and/or the identity of the person 710.

At block B604, the process, based on the analyzing, may determine that the image data 460 includes multiple frames 470 that include a facial image 471 of the person 710, such as and including the frame 470 displayed on the display 730 of the client device 404 in FIG. 28. For example, each of the frames 470 recorded as the person 710 approaches the camera 444 may include various facial images 471 of the person 710. As a result, the various facial images 471 may be analyzed to determine the highest quality and/or most identifiable facial image 471. For example, the facial images 471 from the frames 470 captured when the person 710 was farther away from the camera 444 may be less clear than the frames 470 captured as the person 710 comes closer to the camera 444, such as the frame 470 displayed on the display 730 in FIG. 28. In addition, the person 710 may have been looking to the side, upward, downward, backward, or have a cover of some sort over his or her face during the time the person 710 was in the field of view of the camera 444. As such, certain facial images 471 (e.g., where person 710 is near the camera 444 and/or the front of the face of the person 710 is included in the facial image 471) may be more useful than other facial images 471 (e.g., where the person 710 is far from the camera 444 and/or the person's 710 head is turned to the side such that the side profile of the face is included in the facial image 471). As a result, the process at block B604 may determine the highest quality and/or most identifiable facial image 471 of the person 710 based on at least one of these factors.

In some of the present embodiments, as described above, the first frame 470 including a facial image 471 of the person may be selected (e.g., where the camera 444 is capturing live image data 460). In other embodiments, as described above, the frame 470 may be updated continually and/or at predetermined intervals in response to a higher quality facial image 471 being captured and analyzed, for example.

At block B606, in response to the determination, the user alert 472 including the frame 470 (e.g., the frame 470 with the highest quality facial image 471, the first frame 470 with a facial image 471, etc.) may be generated and transmitted to the client device 404, 406. The notification 475 of the user alert 472 may be programmed to display as a push-notification 724 on the display 730 of the client device 404 (as illustrated in FIG. 27). The push-notification 724 of the user alert 472 may include a facial image 471 of the person 710 from the image data 460. In the illustration of FIG. 27, the facial image 471 of the person 710 may include the front of the face of the person 710 when the person is at the front door, close to the A/V recording and communication device 402 (e.g., within 5 feet).

In addition, in some of the present embodiments, the push-notification 724 of the user alert 472 may include information 720 in the form of text data 464 describing the user alert 472. For example, the push-notification 724 may include a description of the motion event that triggered activation of the camera 444 to record the image data 460, as illustrated in FIG. 27. For example, the push-notification 724 may include an indication that motion has occurred, that a person 710 and/or object is present, the name of the person 710 in the image data 460, etc. The push-notification 724 may further include any information 720 that the user may select to be included in user alerts 472, such as information 720 pertaining to any sensors and/or A/V recording and communication devices 402 in the home environment (e.g., thermostats, lighting sensors, door and window sensors, etc.). The information 720 to be included in the push-notification 724 of the user alert 472 may be based on an analysis of the motion event that triggered activation of the camera 444 to record the image data 460. For example, if the person 710 opened the front door, the information 720 may include the open/close status of the front door, in addition to the presence of motion at the front door caused by the person 710.

In some of the present embodiments, the process of FIG. 25 may be performed by the A/V recording and communication device 402. For example, the processor 452 may receive the image data 460, analyze the image data 460, determine the image data 460 includes the at least one frame 470 including the facial image 471 of the person, and generate and transmit, to the client device 404, 406, using the communication module 450 over the user's network 408 and/or the network (Internet/PSTN) 410, the user alert 472 including the at least one frame 470. In other embodiments, the process of FIG. 25 may be performed by one or more backend devices, such as the backend server 430. For example, the processor 502 may receive the image data 460, analyze the image data 460, determine the image data 460 includes the at least one frame 470 including the facial image 471 of the person, and generate and transmit, to the client device 404, 406, using the network interface 520 over the network (Internet/PSTN) 410, the user alert 472 including the at least one frame 470.

Figure 26:
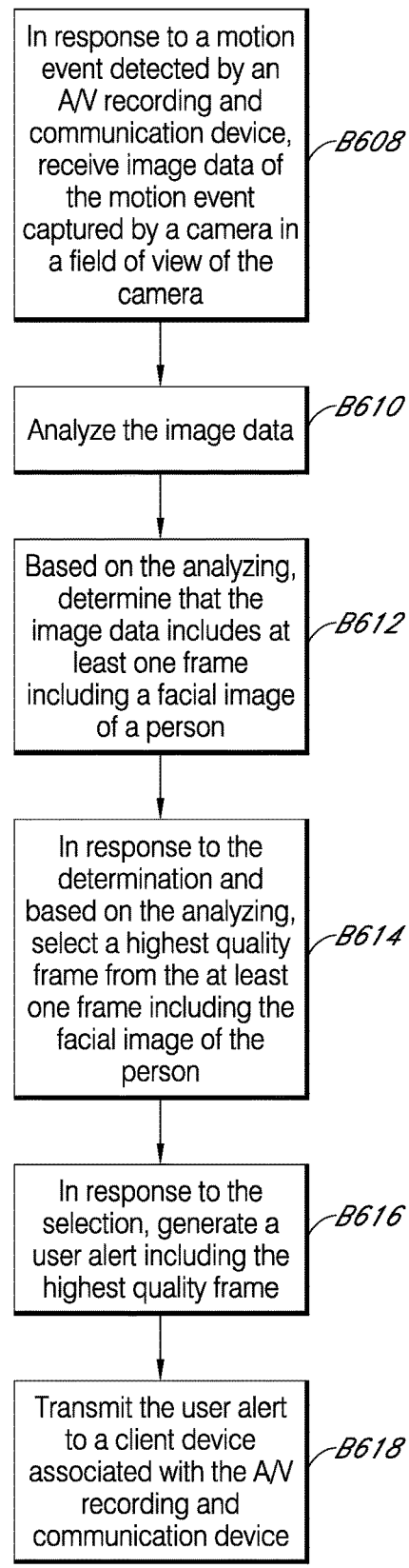

Now referring to FIG. 26, FIG. 26 is a flowchart illustrating one embodiment of a process for selecting a video frame for notification using A/V recording and communication devices according to various aspects of the present disclosure. At block B608, the process, in response to a motion event detected by an A/V recording and communication device, receives image data of the motion event captured by a camera in a field of view of the camera. For example, the processor 452 of the A/V recording and communication device 402 (or the processor 502 of the backend server 430), in response to a motion event detected by the camera 444 in a field of view of the camera 444 and/or the motion sensor 474 in a field of view of the motion sensor 474, may receive the image data 460 of the motion event captured by the camera 444 in the field of view of the camera 444.

Referring to FIG. 28, the person 710 entering the field of view of the motion sensor 474 and/or the field of view of the camera 444 may cause the motion event. In response to the presence of the person 710, the camera 444 may be activated to record the image data 460 of the motion event. In doing so, the camera 444 may capture multiple frames 470 that include facial images 471 of the person 710. The image data 460 may be transmitted by the camera 444 and received by the processor 452 (or the processor 502). In some of the present embodiments, the motion event may be caused by an object and/or an animal, in addition to the person 710. For example, the motion event may be caused by a mail carrier carrying a parcel, or a person walking their dog. In either example, the A/V recording and communication device 402 may detect a motion event and activate the camera 444 to record the image data 460.

At block B610, the process analyzes the image data. For example, the processor 452 (or the processor 502) analyzes the image data 460. This process may be similar to that of block B602 of FIG. 25, described above.

At block B612, the process, based on the analyzing, determines that the image data includes at least one frame including a facial image of a person. For example, the processor 452 (or the processor 502), based on the analyzing, determines that the image data 460 includes the at least one frame 470 including the facial image 471 of the person. This process may be similar to that of block B604 of FIG. 25, described above.

At block B614, the process, in response to the determination and based on the analyzing, selects a highest quality frame from the at least one frame including the facial image of the person. For example, in response to the determination and based on the analyzing, the processor 452 (or the processor 502) selects the highest quality frame 470 from the at least one frame 470 including the facial image 471 of the person. For example, in some of the present embodiments, as discussed above, it may be determined that multiple frames 470 include a facial image 471 of a person or persons. As a result, the multiple frames 470 may be analyzed to make a determination not only that the multiple frames 470 include the facial images 471, but also to determine at least one frame 470 having the highest quality facial image 471. For example, this analysis may be similar to that discussed above with reference to block B602, particularly with reference to analyzing the frames 470 to determine a variety of factors, such as the portion of the face of the person in the facial image 471, the quality of the image data 460 (e.g., where there are multiple cameras 444 and/or one camera operating at a lower resolution), the location and/or movement of the person in the field of view of the camera 444, and/or the identity of the person in the facial image 471. As a result of the analysis, the processor 452 (or the processor 502) may select the highest quality and/or most identifiable frame 470 including the facial image 471 of the person. In some of the present embodiments, the highest quality frame 470 selected may be the frame 470 having the highest quality facial image 471. In other embodiments, the highest quality frame 470 selected may be the frame 470 with a facial image 471 that is most relevant to the motion event and/or most identifiable based on at least some of the above factors analyzed (e.g., the portion of the face in the facial image 471, the quality of the image data 460, the location and/or movement of the person, etc.).

At block B616, the process, in response to the selection, generates a user alert including the highest quality frame. For example, the processor 452 (or the processor 502) generates the user alert 472 including the highest quality frame 470. For example, as described above, the user alert 472 may be generated such that the user alert 472 may be programmed to display as a notification 475 on the client device 404, 406. For example, the notification 475 may display as a push-notification, similar to that of the push-notification 724 of FIG. 27, and the notification 475 may include the facial image 471 from the highest quality frame 470.

At block B618, the process may transmit the user alert to a client device associated with the A/V recording and communication device. For example, the user alert 472 may be transmitted by the processor 452 using the communication module 450 (or the processor 502 using the network interface 520) over the user's network 408 and/or the network (Internet/PSTN) 410 to the client device 404, 406. The notification 475 of the user alert 472 may be displayed on the display of the client device 404, 406 for interaction by the user of the client device 404, 406. As a result of the notification 475 of the user alert 472 including the facial image 471 from the highest quality frame 470, the user may be more likely to interact with the user alert 472 because the user may more quickly and easily identify the person from the facial image 471 as suspicious, for example.

The process of FIG. 26 may be implemented in a variety of embodiments, including those discussed below. However, the embodiments detailed below are not intended to be limiting, and are provided merely as example embodiments of the present disclosure. Other embodiments similar to those outlined herein may also fall within the scope of the present disclosure.

With reference to FIGS. 27-28, the process of FIG. 26, at block B608, may receive the image data 460 captured by the camera 444 in response to the person 710 entering the field of view of the camera 444. The camera 444 may capture the image data 460 in response to the person's 710 presence being detected by the motion sensor 474 in the field of view of the motion sensor 474 and/or by the camera 444 in the field of view of the camera 444. In some of the present embodiments, the camera 444 may record the image data 460 during the entire time the person 710 is present in the field of view of the motion sensor 474 and/or the field of view of the camera 444. For example, the person 710 may enter the field of view of the camera 444 near the street 712, for example, and walk up a front walkway 713 to the porch 711 in front of the front door, where the A/V recording and communication device 402 is located, for example, as illustrated in FIG. 28. As such, the image data 460 may include the person 710 for an extended period of time (e.g., over multiple frames 470 of the image data 460).

At block B610, the process may analyze the image data 460. Similar to the process of block B602 described above, the process may analyze the image data 460 to determine if a person (e.g., the person 710) is present in any of the frames 470, if any of the frames 470 include a facial image 471, and/or a highest quality frame 470 of the frames 470 that include a facial image 471, for example.

For another example, referring to FIG. 28, it may be determined (at block B612) based on the analysis, that the person 710 is present in a plurality of frames 470 of the image data 460 and that several of the plurality of frames 470 includes a facial image 471 of the person 710. A first frame 470 may include a left-side facial profile of the person 710 near a street 712 in front of the house where the A/V recording and communication device 402 is located (e.g., 100 feet from the device). A second frame 470 may include a right-side facial profile of the person 710 on a front walkway 713 leading up to the front door of the house where the A/V recording and communication device 402 is located (e.g., 30 feet from the device 402). A third frame 470 may include a front facial image 471 of the person 710 on the porch 711 in front of the front door of the house where the A/V recording and communication device 402 is located (e.g. 5 feet from the device 402, similar to the illustration of the person 710 in FIG. 28).

At block B614, in response to the determination (at block B612) and based on the analyzing (at block B610), the process selects the highest quality (e.g., most identifiable) frame 470 from the at least one frame 470 including a facial image 471 of the person 710. For example, the first frame 470, the second frame 470, and the third frame 470 discussed above may be analyzed to determine which of the first, the second, and the third frames 470 is the highest quality frame 470. The highest quality frame 470 may not be based solely on the image quality of the facial image 471 in the frame 470. In other words, the highest quality frame 470 may be determined based on more than, or factors other than, the image quality (e.g., clarity) of the facial image 471, such as the distance the person 710 is from the camera 444, the location of the person 710 in the field of view of the camera 444, the speed and/or direction of movement of the person 710, the portion of the face in the facial image 471, etc. As such, in some of the present embodiments, the image data 460 may be analyzed in view of some or all of the above factors to determine which of the frames 470 is the highest quality frame 470.

Based on the analyzing of the first frame 470, the second frame 470, and the third frame 470 from the image data 460, it may be determined that the third frame 470 is the highest quality frame 470. As a result, the third frame 470 may be selected. FIG. 28 may include a visual representation of the third frame 470 displayed on the display 730 of the client device 404, 406, for example, where the third frame 470 includes a front facial image 471 of the person 710 on the porch 711 in front of the front door of the house where the A/V recording and communication device 402 is located.

The first frame 470 may not have been selected because the person 710 may be 100 feet away from the camera 444, for example. As a result, even if the image quality is high (e.g., 1080p), a clear depiction of the facial image 471 of the person 710 may require zooming in, which may lower the quality of the facial image 471 when presented on the display 730 of the client device 404, 406. In addition, it may be determined that the person is walking perpendicular to a line of sight of the camera 444, and thus only a left side profile of the face of the person 710 is present in the first frame 470. As such, determining if the person 710 is suspicious may not be as effective using the left-side profile facial image 471 captured when the person 710 was 100 feet away from the camera 444. Therefore, the first frame 470 may not be as high of a quality of frame 470 as the third frame 470.

The second frame 470 may not have been selected because the person 710 may be 30 feet away from the camera 444, for example. In addition, it may be determined that the person 710 is looking to his or her left, and thus only a right-side profile of the face of the person 710 is present in the second frame 470. As such, determining if the person 710 is suspicious may not be effective using the right-side profile facial image 471. In addition, the person 710 may have been running and/or moving abruptly in the second frame 470, and therefore the facial image 471 may not be as clear as if the person 710 were walking or standing still. Therefore, the second frame 470 may not be as high of a quality of frame 470 as the third frame 470.

The third frame 470 may be selected because the person 710 is within 5 feet of the camera 444, for example. Also, the person 710 may have been standing still, or moving slowly, waiting for somebody to answer the door, for example. In addition, the third frame 470, as illustrated in FIG. 28, includes a front facial image 471 of the person 710, and thus provides a more easily identifiable facial image 471 of the person 710 as compared to the left-side and right-side profile facial images 471 of the first and second frames 470, described above.

In the above example, if the second frame 470 had included a front facial image 471 of the person 710, and the third frame 470 had included a left-side profile facial image 471 of the person 710, the second frame 470 may have been selected. The second frame 470 may have been selected even though the facial image 471 of the third frame may be of higher image quality (e.g., higher resolution, clarity, etc.), because a front facial image 471 may be more useful in aiding the user in identifying the person 710 as suspicious or not, for example.

At block B616, in response to the selection, the process may generate the user alert 472 including the highest quality frame 470 (e.g., the third frame 470 in the above example). For example, the user alert 472 may include a programmed notification 475 for display on the display 730 of the client device 404, 406, as illustrated in FIG. 27. The notification 475 may be programmed to display as a push-notification 724, similar to that described above with respect to block B606 of FIG. 25.

The process, at block B618, may transmit the user alert 472 to the client device 404, 406. The processes of blocks B616 and B618 may be similar to that of block B606 of FIG. 25, described above.

By including the highest quality frame 470 from the image data 460 (e.g., the frame 470 most helpful in identifying the person 710), the user may be more likely to recognize the person 710 as suspicious, and take appropriate action (e.g., alert the police, sound an alarm, and/or alert neighbors). As a result, the user, the user's home, the occupants of the user's home, and the user's neighbors, may all become safer, thereby leading to safer neighborhoods, towns, and cities alike.

In some of the present embodiments, the process of FIG. 26 may be performed by the A/V recording and communication device 402. For example, the processor 452 may receive the image data 460, analyze the image data 460, determine the image data 460 includes the at least one frame 470 including the facial image 471 of the person, select a highest quality frame 470 including the facial image 471 of the person, and generate and transmit, to the client device 404, 406, using the communication module 450 over the user's network 408 and/or the network (Internet/PSTN) 410, the user alert 472 including the highest quality frame 470. In other embodiments, the process of FIG. 25 may be performed by one or more backend devices, such as the backend server 430. For example, the processor 502 may receive the image data 460, analyze the image data 460, determine the image data 460 includes the at least one frame 470 including the facial image 471 of the person, select a highest quality frame 470 including the facial image 471 of the person, and generate and transmit, to the client device 404, 406, using the network interface 520 over the network (Internet/PSTN) 410, the user alert 472 including the highest quality frame 470.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 130, but without the front button 148, the button actuator 228, and/or the light pipe 232.

Figure 29:
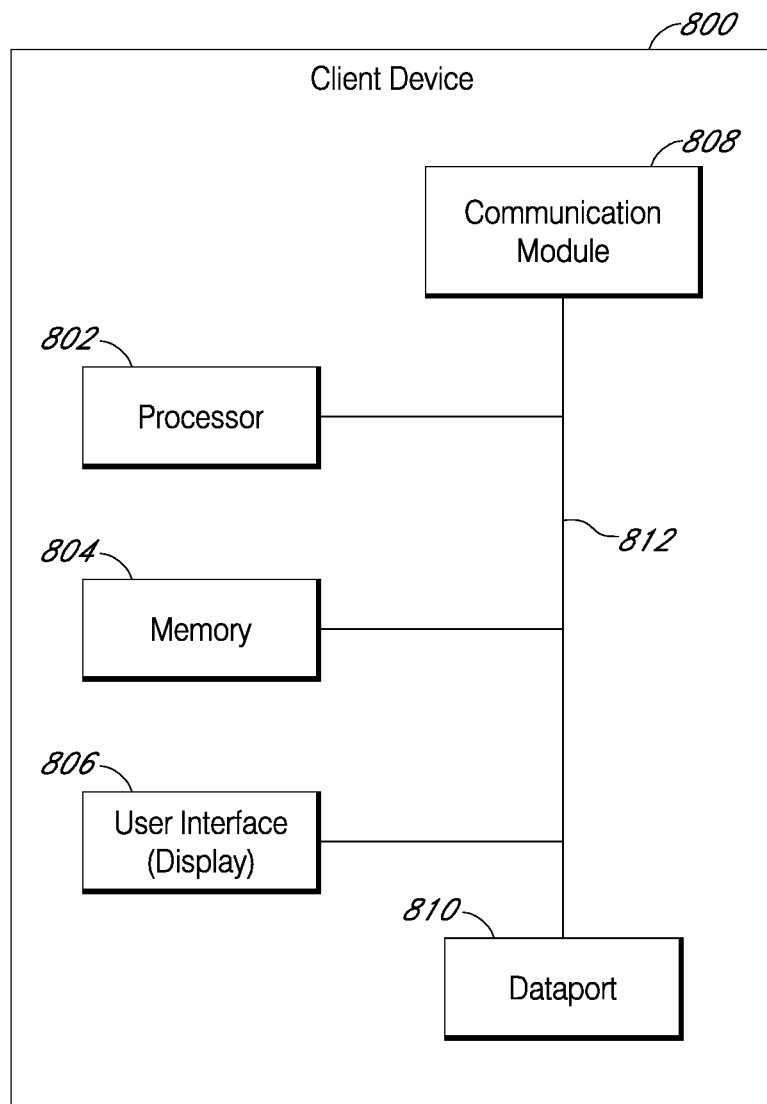
FIG. 29 is a functional block diagram of a client device on which the present embodiments may be implemented according to various aspects of the present disclosure.

FIG. 29 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 29, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM)). In some embodiments, the processor 802 may include one or more other processors, such as one or more conventional microprocessors, and/or one or more supplementary co-processors, such as math co-processors.

The memory 804 may include both operating memory, such as random-access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 30:
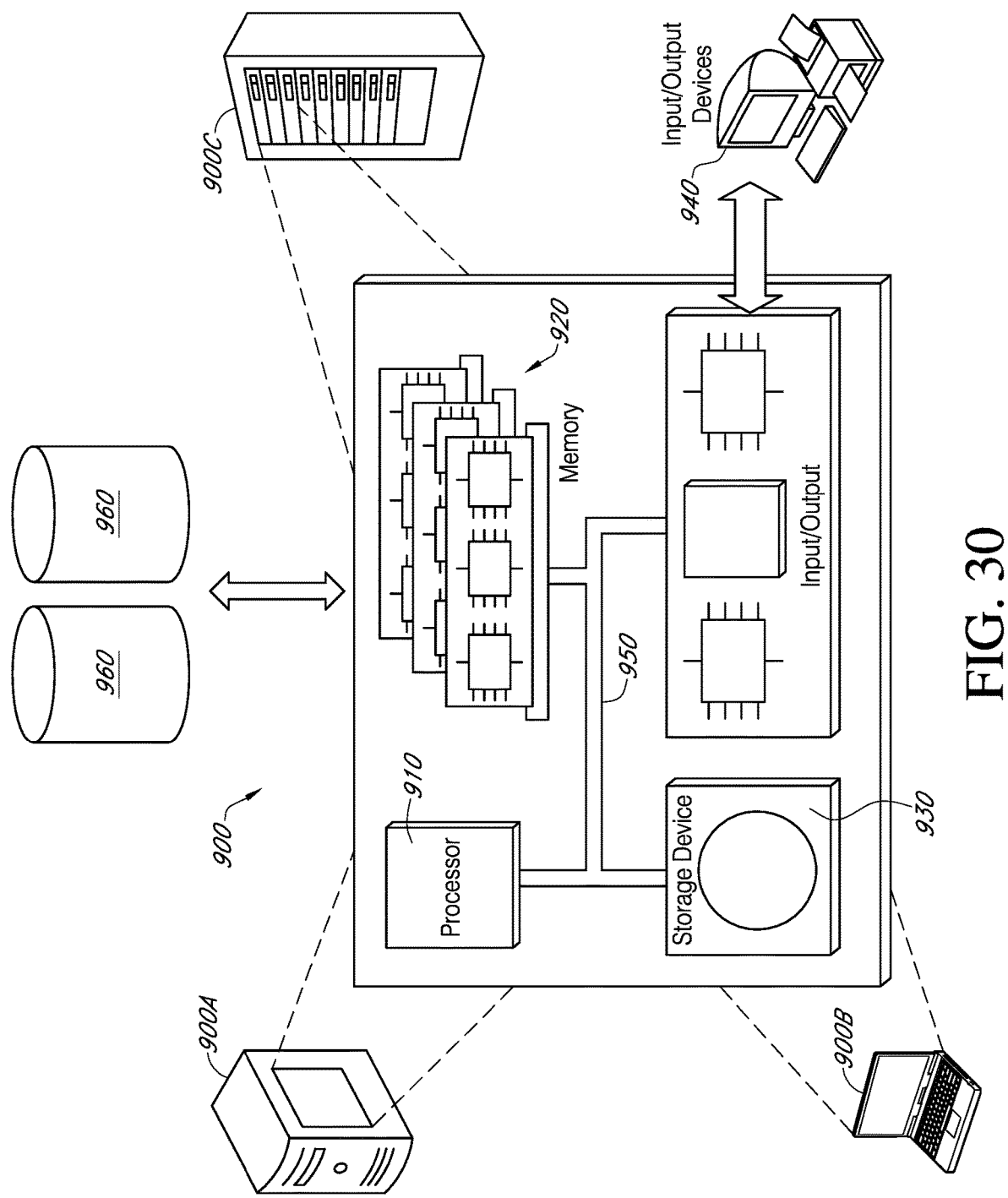
FIG. 30 is a functional block diagram of a general-purpose computing system on which the present embodiments may be implemented according to various aspects of present disclosure.

FIG. 30 is a functional block diagram of a general-purpose computing system on which the present embodiments may be implemented according to various aspects of present disclosure. The computer system 900 may execute at least some of the operations described above. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method comprising:
   based at least in part on detection of an object by an A/V recording and communication device, obtaining image data representative of a field of view of a camera as captured by the camera of the A/V recording and communication device;
   analyzing the image data;
   based at least in part on the analyzing the image data, determining that the image data is representative of a first facial image of a person and a second facial image of the person;
   determining that the first facial image is of higher quality than the second facial image;
   based at least in part on the first facial image being of higher quality than the second facial image, selecting a frame represented by the image data and corresponding to the first facial image;
   generating a first notification including a portion of the image data representing the frame;
   transmitting the first notification to a client device associated with the A/V recording and communication device;
   generating a second notification including an updated frame based on a status of the client device; and
   transmitting the second notification including the updated frame to the client device.

2. The method of claim 1, wherein at least one of the obtaining the image data, the analyzing the image data, the determining that the first facial image is of higher quality than the second facial image, the selecting the frame, the generating the notification, or the transmitting the notification is performed by one or more processors of the A/V recording and communication device.

3. The method of claim 1, wherein at least one of the obtaining the image data, the analyzing the image data, the determining that the first facial image is of higher quality than the second facial image, the selecting the frame, the generating the notification, or the transmitting the notification is performed by one or more processors of one or more backend devices.

4. The method of claim 3, wherein the backend device is at least one of a server, an application programming interface, or a storage device.

5. The method of claim 1, wherein the first notification is a push-notification including a visual representation of the first facial image and the frame, and wherein the push-notification is programmed such that when an input is received to the push-notification to a display of the client device, a visual representation of at least one other frame represented by the image data is displayed on the display.

6. The method of claim 5, wherein the image data is representative of video of the field of view of the camera.

7. The method of claim 1, wherein the detection of the object is by at least one of the camera or a motion sensor of the A/V recording and communication device.

8. The method of claim 1, wherein the determining that the image data is representative of the first facial image of the person and the second facial image of the person comprises:
   determining that the object is the person;
   identifying a face of the person represented by the image data; and
   identifying at least the frame that includes the first facial image of the person and another frame that includes the second facial image of the person.

9. The method of claim 1, wherein the determining that the first facial image is of higher quality than the second facial image comprises:
   determining a first portion of the face of the person in the first facial image;
   determining a second portion of the face of the person in the second facial image; and
   determining that the first portion of the face is more identifiable than the second portion of the face based on the first portion of the face being positioned closer to the camera than the second portion of the face.

10. The method of claim 1, wherein the determining that the first facial image is of higher quality than the second facial image comprises:
    determining a first image quality of the first facial image;
    determining a second image quality of the second facial image; and
    determining that the first image quality is greater than the second image quality based on a determination that a first resolution of the first facial image is greater than a second resolution of a second facial image.

11. The method of claim 1, wherein the image data is captured during a first time and during a motion event, the method further comprising:
    obtaining additional image data at a second time after the first time and during the motion event, the additional image data representative of the field of view of the camera as captured by the camera of the A/V recording and communication device;
    analyzing the additional image data;

based at least in part on the analyzing the additional image data, determining that the additional image data is representative of a third facial image of the person;

determining that the third facial image is of higher quality than the first facial image;

based at least in part on the third facial image being of higher quality than the first facial image, selecting an additional frame represented by the additional image data and corresponding to the third facial image;

generating an additional notification including a portion of the additional image data representing the additional frame; and transmitting the additional notification to the client device associated with the A/V recording and communication device, the additional notification is an additional push-notification including another visual representation of at least a portion of the additional frame including the third facial image.

12. An audio/video device (A/V device) comprising:

a camera configured to capture image data representative of a field of view of the camera, the image data comprising a plurality of frames;

a processor;

a memory storing computer-readable instructions that, when executed by the processor, cause the A/V device to perform operations comprising:

receiving the image data;

analyzing the image data;

based at least in part on the analyzing the image data, determining that a first frame by of the image data is representative of a first facial image of a person and that a second frame of the image data is representative of a second facial image of the person;

determining that the first facial image is of higher quality than the second facial image;

based at least in part on the first facial image being of higher quality than the second facial image, selecting the first frame for inclusion in a first image notification; and generating the first image notification including the first frame;

transmitting, to a client device associated with the A/V device, the first image notification; and generating a second notification including an updated frame based on an input to the client device; and transmitting, to the client device, the second notification including the updated frame.

13. The A/V device of claim 12, wherein at least one of the receiving the image data, the analyzing the image data, the determining that the first frame of the image data is representative of the first facial image of the person, the generating the image notification, or the transmitting the image notification is performed by one or more processors of the A/V device.

14. The A/V device of claim 12, wherein at least one of the receiving the image data, the analyzing the image data, the determining that the first frame of the image data is representative of the first facial image of the person, the generating the image notification, or the transmitting the image notification is performed by one or more processors of one or more backend devices.

15. The A/V device of claim 14, wherein the one or more backend devices comprise at least one of a server, an application programming interface, or a storage device.

16. The A/V device of claim 12, wherein the receiving the image data is in response to detecting the person in at least one of the field of view of the camera or a field of view of a motion sensor of the A/V device.

17. The A/V device of claim 12, wherein the analyzing the image data comprises at least one of:

analyzing, using a facial detection algorithm, the image data;

analyzing, using computer vision processing, the image data; or analyzing, using image processing, the image data.

18. The A/V device of claim 12, wherein the determining that the first facial image is of higher quality than the second facial image comprises:

determining a first portion of the face of the person in the first facial image;

determining a second portion of the face of the person in the second facial image; and determining that the first portion of the face is more identifiable than the second portion of the face based on the first portion of the face being positioned closer to the camera than the second portion of the face.

19. The A/V device of claim 12, wherein the determining that the first facial image is of higher quality than the second facial image comprises:

determining a first image quality of the first facial image;

determining a second image quality of the second facial image; and determining that the first image quality is greater than the second image quality based on a determination that a first resolution of the first facial image is greater than a second resolution of a second facial image.

20. The method of claim 1, wherein the analyzing the image data comprises:

determining a location or direction of motion of the object;

determining a resolution of the image data; and determining that the image data corresponds to at least a portion of a face of a first person.

* * * * *